United States Patent
Brown et al.

(10) Patent No.: US 10,019,352 B2
(45) Date of Patent: Jul. 10, 2018

(54) SYSTEMS AND METHODS FOR ADAPTIVE RESERVE STORAGE

(71) Applicant: SanDisk Technologies LLC, Plano, TX (US)

(72) Inventors: Michael Brown, Campbell, CA (US); Nisha Talagala, Livermore, CA (US); Robert Wood, Niwot, CO (US); Ned Plasson, Park City, UT (US)

(73) Assignee: SanDisk Technologies LLC, Addison, TX (US)

( * ) Notice: Subject to any disclaimer, the term of this patent is extended or adjusted under 35 U.S.C. 154(b) by 278 days.

(21) Appl. No.: 14/333,365

(22) Filed: Jul. 16, 2014

(65) Prior Publication Data
US 2015/0113223 A1    Apr. 23, 2015

Related U.S. Application Data

(60) Provisional application No. 61/893,024, filed on Oct. 18, 2013.

(51) Int. Cl.
*G06F 12/00* (2006.01)
*G06F 12/02* (2006.01)
(Continued)

(52) U.S. Cl.
CPC ........ *G06F 12/023* (2013.01); *G06F 12/0238* (2013.01); *G06F 12/0871* (2013.01);
(Continued)

(58) Field of Classification Search
CPC ............... G06F 12/023; G06F 12/0893; G06F 12/0238; G06F 12/0871; G06F 12/12; G06F 2212/604
(Continued)

(56) References Cited

U.S. PATENT DOCUMENTS

| 5,193,184 A | 3/1993 | Belsan et al. |
| 5,325,509 A | 6/1994 | Lautzenhaiser |

(Continued)

FOREIGN PATENT DOCUMENTS

| WO | WO02/01365 A2 | 1/2002 |
| WO | WO2008/147752 A1 | 12/2008 |

(Continued)

OTHER PUBLICATIONS

Brown, et al., International Search Report and Written Opinion dated Dec. 19, 2014 for international application PCT/US2014/060948.

*Primary Examiner* — Gurtej Bansal
(74) *Attorney, Agent, or Firm* — Loza & Loza, LLP; Gabriel Fitch

(57) ABSTRACT

A storage layer may over-provision physical storage resources of a storage medium by reserving a portion of the full physical storage capacity of the storage medium for use as reserve capacity. The reserve capacity may be used to prevent write stall conditions and/or for grooming operations, such as storage recovery, refresh, and the like. A reserve module may be configured to adapt the reserve capacity in accordance with, inter alia, operating conditions on the storage layer. The reserve module may be configured to dynamically modify the storage capacity available through the storage layer. A cache layer configured to cache data of a backing store on the storage layer, may be configured to add and/or remove cache entries in response to changes in the reserve capacity.

20 Claims, 12 Drawing Sheets

(51) Int. Cl.
  *G06F 12/0893* (2016.01)
  *G06F 12/0871* (2016.01)
  *G06F 12/12* (2016.01)
  *G06F 3/06* (2006.01)

(52) U.S. Cl.
  CPC ........ *G06F 12/0893* (2013.01); *G06F 3/0631* (2013.01); *G06F 3/0679* (2013.01); *G06F 3/0688* (2013.01); *G06F 12/12* (2013.01); *G06F 2212/1024* (2013.01); *G06F 2212/1044* (2013.01); *G06F 2212/214* (2013.01); *G06F 2212/466* (2013.01); *G06F 2212/604* (2013.01); *G06F 2212/7204* (2013.01); *G06F 2212/7205* (2013.01); *G06F 2212/7206* (2013.01)

(58) Field of Classification Search
  USPC .......................................................... 711/133
  See application file for complete search history.

(56) References Cited

U.S. PATENT DOCUMENTS

| | | | |
|---|---|---|---|
| 5,404,485 A | 4/1995 | Ban | |
| 5,488,701 A | 1/1996 | Brady et al. | |
| 5,553,261 A | 9/1996 | Hasbun et al. | |
| 5,598,370 A | 1/1997 | Nijima et al. | |
| 5,651,133 A | 7/1997 | Burkes | |
| 5,754,567 A | 5/1998 | Norman | |
| 5,831,989 A | 11/1998 | Fujisaki | |
| 5,835,935 A | 11/1998 | Estakhri et al. | |
| 5,854,796 A | 12/1998 | Sato | |
| 6,000,006 A | 7/1999 | Bruce et al. | |
| 6,014,724 A | 1/2000 | Jennett | |
| 6,014,755 A | 1/2000 | Wells et al. | |
| 6,034,831 A | 3/2000 | Dobbek et al. | |
| 6,188,619 B1 | 2/2001 | Jung | |
| 6,236,593 B1 | 5/2001 | Hong et al. | |
| 6,330,688 B1 | 12/2001 | Brown | |
| 644,647 A1 | 6/2002 | Minne | |
| 6,412,080 B1 | 6/2002 | Fleming et al. | |
| 6,658,438 B1 | 12/2003 | Moore et al. | |
| 6,715,027 B2 | 3/2004 | Kim et al. | |
| 6,751,155 B2 | 7/2004 | Gorobets | |
| 6,775,185 B2 | 8/2004 | Fujisawa et al. | |
| 6,850,443 B2 | 2/2005 | Lofgren et al. | |
| 6,985,992 B1 | 1/2006 | Chang et al. | |
| 6,996,676 B2 | 2/2006 | Megiddo | |
| 7,010,662 B2 | 3/2006 | Aasheim et al. | |
| 7,043,599 B1 | 5/2006 | Ware et al. | |
| 7,076,599 B2 | 7/2006 | Aasheim et al. | |
| 7,076,606 B2 | 7/2006 | Orsley | |
| 7,082,495 B2 | 7/2006 | DeWhitt et al. | |
| 7,082,512 B2 | 7/2006 | Aasheim et al. | |
| 7,085,879 B2 | 8/2006 | Aasheim et al. | |
| 7,093,101 B2 | 8/2006 | Aasheim et al. | |
| 7,096,321 B2 | 8/2006 | Modha | |
| 7,167,953 B2 | 1/2007 | Megiddo et al. | |
| 7,181,572 B2 | 2/2007 | Walmsley | |
| 7,215,580 B2 | 5/2007 | Gorobets | |
| 7,224,604 B2 | 5/2007 | Lasser | |
| 7,340,566 B2 | 3/2008 | Voth | |
| 7,340,581 B2 | 3/2008 | Gorobets et al. | |
| 7,395,384 B2 | 7/2008 | Sinclair et al. | |
| 7,409,492 B2 | 8/2008 | Tanaka et al. | |
| 7,440,455 B2 | 10/2008 | Malas et al. | |
| 7,450,420 B2 | 11/2008 | Sinclair et al. | |
| 7,451,264 B2 | 11/2008 | Yero | |
| 7,451,266 B2 | 11/2008 | Shinagawa et al. | |
| 7,480,766 B2 | 1/2009 | Gorobets | |
| 7,516,267 B2 | 4/2009 | Coulson et al. | |
| 7,552,271 B2 | 6/2009 | Sinclair et al. | |
| 7,552,272 B2 | 6/2009 | Gonzalez et al. | |
| 7,631,138 B2 | 12/2009 | Gonzalez et al. | |
| 7,644,239 B2 | 1/2010 | Ergan et al. | |
| 7,680,977 B2 | 3/2010 | Luo et al. | |
| 7,734,865 B2 | 6/2010 | Tanaka et al. | |
| 7,765,426 B2 | 7/2010 | Li | |
| 7,852,582 B2 | 12/2010 | Ermolov et al. | |
| 7,861,122 B2 | 12/2010 | Cornwell et al. | |
| 7,944,762 B2 | 5/2011 | Gorobets | |
| 7,970,986 B2 | 6/2011 | Tanaka et al. | |
| 7,984,084 B2 | 7/2011 | Sinclair | |
| 8,004,894 B2 | 8/2011 | Gonzalez et al. | |
| 8,015,346 B2 | 9/2011 | Chen et al. | |
| 8,019,938 B2 | 9/2011 | Flynn et al. | |
| 8,156,392 B2 | 4/2012 | Flynn et al. | |
| 8,194,978 B2 | 6/2012 | Flynn et al. | |
| 8,291,151 B2 | 10/2012 | Sinclair | |
| 8,301,826 B2 | 10/2012 | Gonzalez et al. | |
| 8,429,340 B2 | 4/2013 | Tanaka et al. | |
| 8,452,929 B2 | 5/2013 | Bennett | |
| 8,479,080 B1 | 7/2013 | Ofir et al. | |
| 8,639,872 B1* | 1/2014 | Boyle | G06F 12/0871 711/103 |
| 8,788,745 B2 | 7/2014 | Tanaka et al. | |
| 2003/0204788 A1 | 10/2003 | Smith | |
| 2006/0184722 A1 | 8/2006 | Sinclair | |
| 2007/0028053 A1 | 2/2007 | Uday et al. | |
| 2007/0033326 A1 | 2/2007 | Sinclair | |
| 2007/0033362 A1 | 2/2007 | Sinclair | |
| 2007/0043900 A1 | 2/2007 | Yun | |
| 2007/0143560 A1 | 6/2007 | Gorobets | |
| 2007/0156998 A1 | 7/2007 | Gorobets | |
| 2007/0255889 A1 | 11/2007 | Yogev et al. | |
| 2007/0266276 A1 | 11/2007 | Gatzemeier et al. | |
| 2008/0059693 A1 | 3/2008 | Yang et al. | |
| 2008/0294814 A1 | 11/2008 | Gorobets | |
| 2009/0006757 A1* | 1/2009 | Singhal | G06F 12/0897 711/128 |
| 2010/0115178 A1 | 5/2010 | Sauber | |
| 2011/0060887 A1* | 3/2011 | Thatcher | G06F 3/0604 711/171 |
| 2011/0066788 A1* | 3/2011 | Eleftheriou | G11C 16/3495 711/103 |
| 2011/0066808 A1 | 3/2011 | David et al. | |
| 2011/0099320 A1 | 4/2011 | Gregg et al. | |
| 2011/0246709 A1 | 10/2011 | Chen et al. | |
| 2013/0232289 A1 | 9/2013 | Zhong et al. | |
| 2013/0238851 A1 | 9/2013 | Koling et al. | |
| 2013/0326269 A1 | 12/2013 | Losh et al. | |
| 2013/0326284 A1 | 12/2013 | Losh et al. | |
| 2014/0240335 A1* | 8/2014 | Hu | G06F 12/0246 345/543 |

FOREIGN PATENT DOCUMENTS

| | | |
|---|---|---|
| WO | WO2009/140700 A1 | 11/2009 |
| WO | WO2010/054410 A2 | 5/2010 |

* cited by examiner

SYSTEMS AND METHODS FOR ADAPTIVE RESERVE STORAGE

TECHNICAL FIELD

This disclosure relates to storage systems and, in particular, to systems and methods for managing reserve storage capacity of a non-volatile storage device.

SUMMARY

Disclosed herein are embodiments of a method for adaptive reserve storage. The disclosed method may comprise providing access to storage space of a storage device allocated to a cache, wherein the allocated storage space is less than a total storage space of the storage device, and modifying the storage space allocated to the cache based on a determined write load for the cache, by one or more of, increasing the storage space allocated to the cache in response to a decrease in the determined write load for by the cache, and/or decreasing the storage space allocated to the cache in response to an increase in the determined write load for the cache.

The method may further comprise determining the write load for the cache based on one or more of a number of storage divisions in a write queue, a rate of storage recovery operations performed on the storage device, write operations performed on the storage device per unit time, a rate of write operations performed on the storage device in response to cache misses, a rate of write operations performed on the storage device in response to write operations pertaining to data in the cache, and a ratio of write operations to read operations performed in the storage space allocated to the cache. The disclosed method may further include using the reserved storage space to relocate data within the storage device. Alternatively, or in addition, the reserve storage may be used one or more of grooming operations, storage division recovery operations, data relocation operations, and available write capacity.

In some embodiments, a portion of the total storage space of the storage device is designated as reserve storage space of the storage device, such that increasing the storage space allocated to the cache comprises decreasing the reserve storage space, and decreasing the storage space allocated to the cache comprises increasing the reserve storage space. Decreasing the storage space allocated to the cache comprises evicting data from the cache. Evicting the data from the cache may comprise deallocating the data in the storage device. Alternatively, or in addition, decreasing the storage space allocated to the cache comprises removing one or more entries from the cache.

Disclosed herein are embodiments of an apparatus for adaptive reserve storage. The disclosed apparatus may comprise a storage layer of a storage medium, wherein a portion of a storage capacity of the storage medium is provisioned as reserve storage capacity and another portion is provisioned as available storage capacity, wherein the available storage capacity is less than an accessible physical storage capacity of the storage medium, a monitoring module configured to monitor storage operations performed on the storage medium, and a reserve module configured to modify a size of the reserve storage capacity in response to the monitored storage operations.

The monitoring module may be configured to determine an operating profile of the storage medium based on the monitored storage operations, and wherein the operating profile comprises one or more of a rate of write operations performed on the storage medium, a ratio of write operations to read operations performed on the storage medium, write capacity availability, and write stall conditions.

The reserve module may be configured to modify the size of the reserve storage capacity in response to determining an optimal size of the reserve storage capacity based on one or more of a quality of service policy and a optimization criterion. In some embodiments, the reserve module is be configured to expand the reserve storage capacity in response to the operating profile indicating increased write loads on the storage medium, wherein expanding the reserve storage capacity comprises contracting the available storage capacity. The reserve module may be configured to reduce the reserve storage capacity in response to the monitored storage operations indicating high write capacity availability on the storage medium.

In some embodiments, the apparatus may include a groomer module configured to re-initialize storage divisions of the storage medium to a writeable state and to maintain a write queue identifying writeable storage divisions of the storage medium. The apparatus may further comprise an allocation module of a cache, which may be configured to reallocate cache tags of the cache in response to modifications to a size of the available storage capacity. In response to a reduction in the size of the available storage capacity, the allocation module may be configured to a) evict data from the cache, and/or b) deallocate one or more cache tags corresponding to the evicted data.

Disclosed herein are further embodiments of operations for adaptive reserve storage. The operations may include performing storage operations on a solid-state storage medium having a usable storage capacity, wherein a portion of the usable storage capacity is designated as reserve capacity, and another portion of the useable storage capacity is available for use to store data of a client, determining a write workload for the solid-state storage medium in response to the storage operations performed on the solid-state storage medium, and/or modifying a size of the reserve capacity based on the determined write workload, wherein modifying the size of the reserve capacity comprises modifying a size of the portion of usable storage capacity that is available to store data of the client.

In some embodiments, the disclosed operations further comprise developing a write capacity profile in response to the storage operations performed on the solid-state storage medium, wherein developing the write capacity profile comprises monitoring one or more of a size of a write queue of the solid-state storage medium, a rate of write operations performed on the solid-state storage medium, a ratio of write operations to read operations performed on the storage medium, and storage recovery operations performed on the solid-state storage medium.

The client may comprise a cache layer, and wherein the cache layer is configured to modify a capacity of the cache in response to modifying the size of the reserve capacity. The operations may further include informing the cache layer of the modification to the size of the portion of usable storage capacity that is available to store data of the client.

DETAILED DESCRIPTION

Figure 1A:
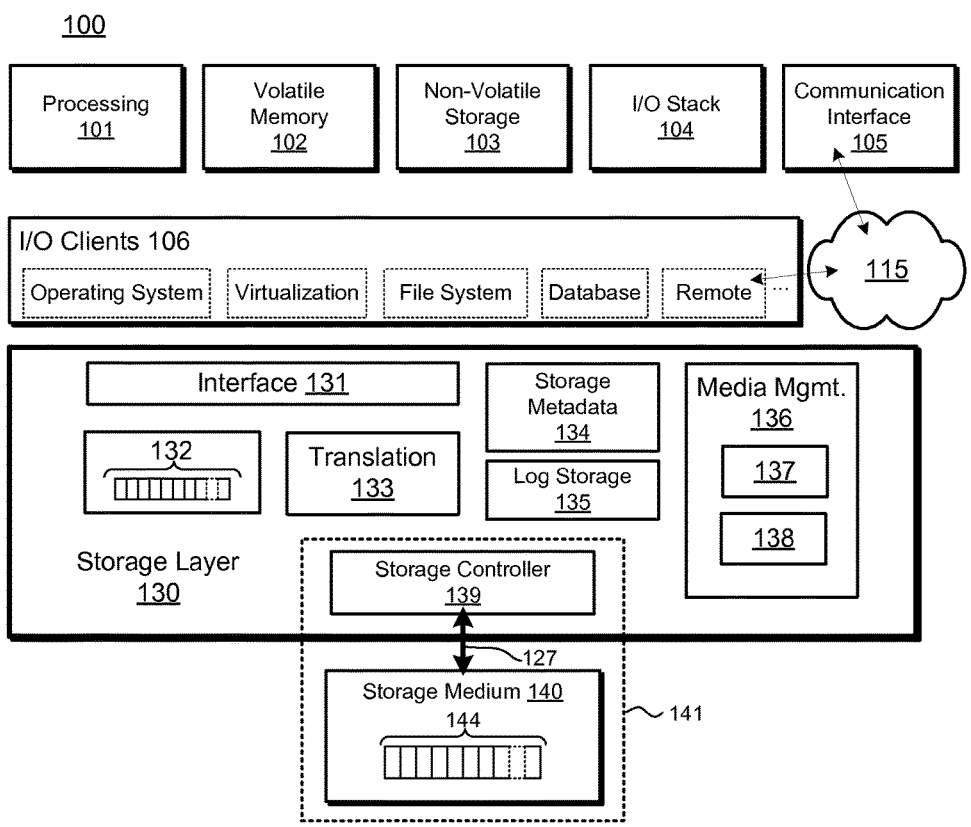
FIG. 1A is a block diagram of one embodiment of a storage layer.

FIG. 1A is a block diagram of one embodiment of a computing system 100 comprising a storage layer 130 configured to provide I/O and/or storage services to one or more I/O clients 106. The computing system 100 may comprise any computing device, including, but not limited to, a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 105. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, solid-state storage medium, optical storage medium, and/or the like. The communication interface 105 may be configured to communicatively couple the computing system 100 to a network 115. The network 115 may comprise any suitable communication network, including, but not limited to, a Transmission Control Protocol/Internet Protocol (TCP/IP) net work, a Local Area Network (LAN), a Wide Area Network (WAN), a Virtual Private Network (VPN), a Storage Area Network (SAN), a Public Switched Telephone Network (PSTN), the Internet, and/or the like.

The I/O clients 106 may include, but are not limited to, operating systems (including bare metal operating systems, guest operating systems, virtual machines, and the like), virtualization systems (virtualization kernels, hypervisors, virtual machines, and/or the like), file systems, database systems, remote I/O clients (e.g., I/O clients 106 communicatively coupled to the computing system 100 and/or storage layer 130 through the network 115), and/or the like.

The storage layer 130 (and/or modules thereof) may be implemented in software, hardware, or a combination thereof. In some embodiments, portions of the storage layer 130 are embodied as executable instructions, such as computer program code, which may be stored on a persistent, non-transitory storage medium, such as the non-volatile storage resources 103, storage medium 140, firmware, and/or the like. The instructions and/or computer program code may be configured for execution by the processing resources 101 of the computing system 100 and/or processing resources of other components and/or modules, such as the storage controller 139. Alternatively, or in addition, portions of the storage layer 130 and/or other modules disclosed herein may be embodied as machine components, such as general and/or application-specific components, programmable hardware, FPGAs, ASICs, hardware controllers, storage controllers, and/or the like.

The storage layer 130 may be configured to perform storage operations on the storage medium 140. The storage medium 140 may comprise any storage medium capable of storing data persistently. As used herein, "persistent" data storage refers to storing information on a persistent, non-volatile storage medium. The storage medium 140 may include non-volatile storage media, such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writeable optical drives (e.g., CD drives, DVD drives, Blu-ray drives, etc.), and/or the like.

In some embodiments, the storage medium 140 comprises non-volatile, solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory, including both non-volatile and volatile forms. Accordingly, although particular embodiments of the storage layer 130 are disclosed in the context of non-volatile, solid-state storage devices, the storage layer 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to the memory of the processing resources 101, such as a CPU cache (e.g., L1, L2, L3 cache, etc.), graphics memory, and/or the like. In some embodiments, the storage medium 140 is communicatively coupled to the storage layer 130 by use of an interconnect 127. The interconnect 127 may include, but is not limited to, peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), and/or the like. Alternatively, the storage medium 140 may be a remote storage device that is communicatively coupled to the storage layer 130 through the network 115 (and/or other communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage layer 130 may be configured to manage storage operations on the storage medium 140 by use of inter alia, the storage controller 139. The storage controller 139 may comprise software and/or hardware components, including, but not limited to, one or more drivers and/or other software modules operating on the computing system 100, such as storage drivers, I/O drivers, filter drivers, and/or the like; hardware components, such as hardware controllers, communication interfaces, and/or the like; and so on. The storage medium 140 may be embodied on a storage device 141. Portions of the storage layer 130 (e.g., storage controller 139) may be implemented as hardware and/or software components (e.g. firmware) of the storage device 141.

The storage controller 139 may be configured to implement storage operations at particular storage locations of the storage medium 140. As used herein, a storage location refers to a unit of storage of a storage resource (e.g., a storage medium and/or device) that is capable of storing data persistently; storage locations may include, but are not limited to, pages, groups of pages (e.g., logical pages and/or offsets within a logical page), storage divisions (e.g., physical erase blocks, logical erase blocks, etc.), sectors, locations on a magnetic disk, battery-backed memory locations, and/or the like. The storage locations may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage locations.

The storage layer 130 may comprise an interface 131 through which I/O clients 106 may access storage services provided by the storage layer 130. The storage interface 131 may include one or more of a block device interface, an object storage interface, a file storage interface, a key-value storage interface, a virtualized storage interface, one or more virtual storage units (VSUs), an object storage interface, a database storage interface, and/or other suitable interfaces and/or an Application Programming Interface (API), and the like.

The storage layer 130 may provide for referencing storage resources through a front-end storage interface. As used herein, a "front-end storage interface" refers to an interface and/or namespace through which I/O clients 106 may refer to storage resources of the storage layer 130. A storage interface may correspond to a logical address space 132. The logical address space 132 may comprise a group, set, collection, range, and/or extent of identifiers. As used herein, an "identifier" or "logical identifier" (LID) refers to an identifier for referencing an I/O resource; LIDS may include, but are not limited to, names (e.g., file names, distinguished names, and/or the like), data identifiers, references, links, front-end identifiers, logical addresses, logical block addresses (LBAs), storage unit addresses, virtual storage unit (VSU) addresses, logical unit number (LUN) addresses, virtual unit number (VUN) addresses, virtual logical unit number (VLUN) addresses, virtual storage addresses, storage addresses, physical addresses, media addresses, back-end addresses, unique identifiers, globally unique identifiers (GUIDs), and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage layer 130 is configured to provide a 64-bit logical address space 132 (e.g., a logical address space comprising $2^{26}$ unique LiDs), which may exceed the physical storage capacity of the storage medium 140. The storage layer 130 may leverage the large, thinly provisioned logical address space 132 to efficiently allocate and/or reference contiguous ranges of LIDs for the I/O clients 106, while reducing the chance of naming conflicts.

The translation module 133 of the storage layer 130 may be configured to map LIDs of the logical address space 132 to storage resources (e.g., data stored within the storage address space 144 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 144. In some embodiments, the logical address space 132 is sparse, thinly provisioned, and/or over-provisioned, such that the size of the logical address space 132 differs from the storage address space 144 of the storage medium 140.

The storage layer 130 may be configured to maintain storage metadata 131 pertaining to storage operations performed on the storage medium 140. The storage metadata 134 may include, but is not limited to, a forward map comprising any-to-any mappings between LIDs of the logical address space 132 and storage addresses within the storage address space 144, a reverse map pertaining to the contents of storage locations of the storage medium 140, validity bitmaps, reliability testing and/or status metadata, status information e.g., error rate, retirement status, and so on), cache metadata, and/or the like. Portions of the storage metadata 134 may be maintained within the volatile memory resources 102 of the computing system 100. Alternatively, or in addition, portions of the storage metadata 134 may be stored on non-volatile storage resources 103 and/or the storage medium 140.

Figure 1B:
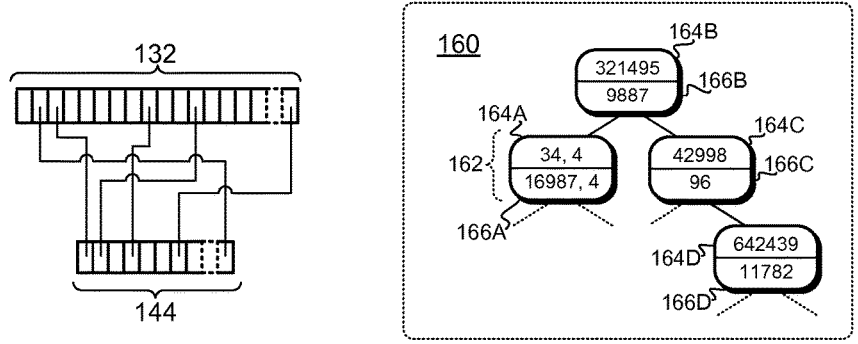
FIG. 1B depicts embodiments of storage metadata.

FIG. 1B depicts one embodiment of any-to-any mappings between LIDs of the logical address space 132 and back-end identifiers (e.g., storage addresses) within the storage address space 144. The any-to-any mappings may be maintained in one or more data structures of the storage metadata 134. As illustrated in FIG. 1B, the translation module 133 may be configured to map any storage resource identifier (any LID of the logical address space 132) to any back-end storage location. As further illustrated, the logical address space 132 may be sized differently than the underlying storage address space 144. In the FIG. 1B embodiment, the logical address space 132 may be thinly provisioned, and, as such, may comprise a larger range of LIDs than the range of storage addresses in the storage address space 144.

As disclosed above, I/O clients 106 may reference storage resources of the storage layer 130 by use of, inter alia, LIDs of the logical address space 132. Accordingly, the logical address space 132 may correspond to a logical or front-end interface of the storage resources, and the mappings to particular storage addresses within the storage address space 144 may correspond to a back-end interface of the storage resources.

The storage layer 130 may be configured to maintain the any-to-any mappings between the logical interface and back-end interface in a forward map 160 (FIG. 1B). The forward map 160 may comprise any suitable data structure, including, but not limited to, an index, a map, a hash map, a hash table, a tree, a range-encoded tree, a b-tree, and/or the like. The forward map 160 may comprise entries 162 corresponding to LiDs that have been allocated for use to reference data stored on the storage medium 140. The entries 162 of the forward map 160 may associate LIDs 164A-D with respective storage addresses 166A-D within the storage address space 144. The forward map 160 may be sparsely populated and, as such, may omit entries corresponding to LIDs that are not currently allocated to I/O clients 106 and/or are not currently in use to reference valid data stored on the storage medium 140. In some embodiments, the forward map 160 comprises a range-encoded data structure, such that one or more of the entries 162 correspond to a plurality of LIDs (e.g., a range, extent, and/or set of LIDs). In the FIG. 1B embodiment, the forward map 160 includes an entry 162 corresponding to a range of LIDs 164A (LID range 34 of length 4, comprising LIDs 34-37) mapped to a corresponding range of storage addresses 166A (16987-16990). The entries 162 of the forward map 160 may be indexed by LID in, inter alia, a tree data structure. The disclosure is not limited in his regard, however, and could be adapted to use any suitable data structure and/or indexing mechanism.

Figure 1C:
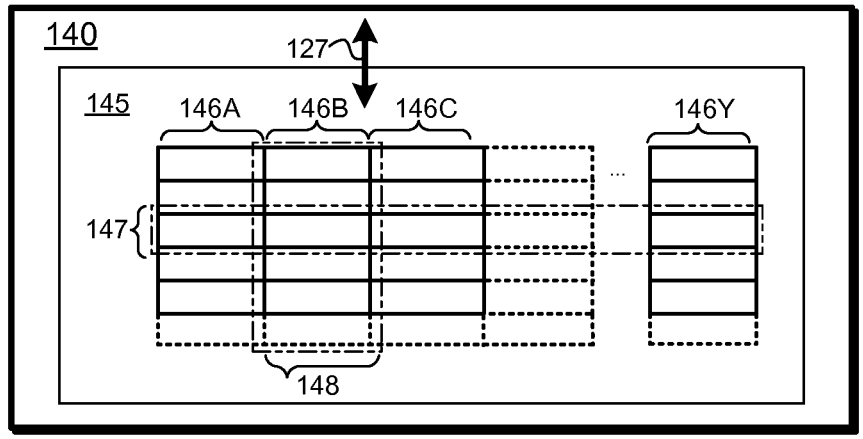
FIG. 1C a block diagram depicting one embodiment of a storage array.

Referring to FIG. 1C, in some embodiments, the storage medium 140 may comprise a solid-state storage array 145 comprising a plurality of solid-state storage elements 146A-Y. As used herein, a solid-state storage array (or array) 145 refers to a set of two or more independent columns 148. A column 148 may comprise one or more solid-state storage elements 146A-Y that are communicatively coupled to the storage layer 130 in parallel using, inter cilia, the interconnect 127. Rows 147 of the array 145 may comprise physical storage units of the respective columns 148 (solid-state storage elements 146A-Y). As used herein, a solid-state storage element 146A-Y includes, but is not limited to, solid-state storage resources embodied as a package, chip, die, plane, printed circuit board, and/or the like. The solid-state storage elements 146A-Y comprising the array 145 may be capable of independent operation. Accordingly, a first one of the solid-state storage elements 146A may be capable of performing a first storage operation while a second solid-state storage element 146B performs a different storage operation. For example, the solid-state storage element 146A may be configured to read data at a first physical address, while another solid-state storage element 146B reads data at a different physical address.

A solid-state storage array 145 may also be referred to as a logical storage element (LSE). As disclosed in further detail herein, the solid-state storage array 145 may comprise logical storage units (rows 147). As used herein, a "logical storage unit" or row 147 refers to a combination of two or more physical storage units, each physical storage unit on a respective column 148 of the array 145. A logical erase block refers to a set of two or more physical erase blocks, a logical page refers to a set of two or more pages, and so on. In some embodiments, a logical erase block may comprise erase blocks within respective logical storage elements 146A-Y and/or banks. Alternatively, a logical erase block may comprise erase blocks within a plurality of different arrays 145 and/or may span multiple banks of solid-state storage elements.

Figure 1D:
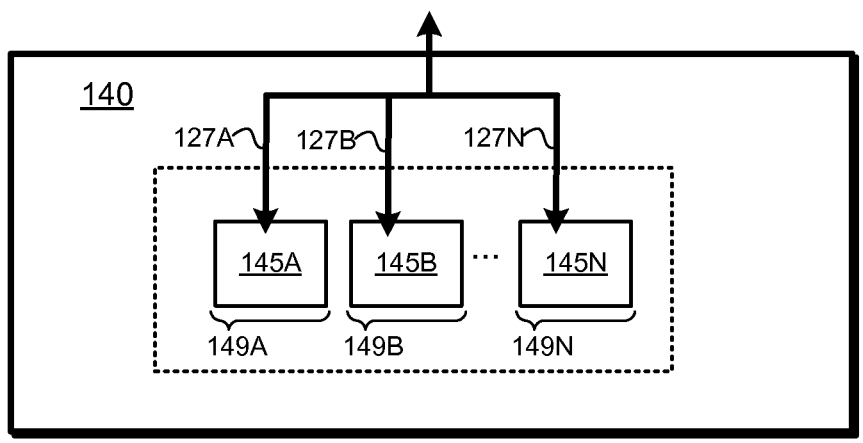
FIG. 1D is a block diagram depicting one embodiment of a plurality of independent storage banks.

FIG. 1D depicts one embodiment of storage medium 140 comprising a plurality of independent banks 149A-N, each comprising one or more solid-state storage arrays 145A-N. Each of the independent banks 149A-N may be communicatively coupled to the storage controller 139 via a respective interconnect 127A-N. The storage layer 130 may be configured to store data on respective banks 149A-N of the storage medium 140. Further embodiments of systems and methods for arranging data for storage on solid-state storage arrays 145A-N and/or banks 149A-N of solid-state storage arrays 145A-N are disclosed in U.S. patent application Ser. No. 13/784,705, entitled "Systems and Methods for Adaptive Storage," filed Mar. 4, 2013, for David Flynn et al, which is hereby incorporated by reference in its entirety.

Referring back to FIG. 1A, the storage layer 130 may further comprise a log storage module 135 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. Accordingly, the storage layer 130 may be configured to store data in a contextual, self-describing format. As used herein, a contextual or self-describing format refers to a data format in which data is stored in association with persistent metadata. In some embodiments, the persistent metadata may be configured to identify the data and, as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

Figure 1E:
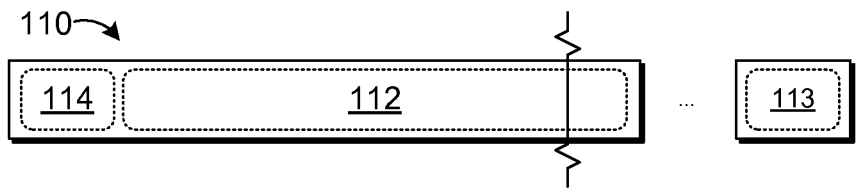
FIG. 1E depicts one embodiment of a contextual data storage format.

FIG. 1E illustrates one embodiment of a contextual data format. The data packet format 110 of FIG. 1E comprises a data segment 112 and persistent metadata 114. The data segment 112 may be of any arbitrary length and/or size. The persistent metadata 114 may be embodied as one or more header fields of the data packet 110. The persistent metadata 114 may be configured to define the logical interface of the data segment 112 and, as such, may include and/or reference the LID(s) associated with the data segment 112. Although FIG. 1E depicts packet format 110, the disclosure is not limited in this regard and could associate data (e.g., data segment 112) with persistent, contextual metadata in other ways, including, but not limited to, an index on the storage medium 140, a storage division index, a separate metadata channel, and/or the like.

In some embodiments, the log storage module 135 is further configured to associate data packets 110 with sequence information 113. The sequence information 113 may be used to determine the relative order of the data packets 110 stored on the storage medium 140. In some embodiments, the log storage module 135 and/or storage controller 139 are configured to assign sequence information 113 to sections of the storage medium 140. The sections may correspond to storage divisions, erase blocks, logical erase blocks, and/or the like. Each section may be capable of storing a plurality of data packets 110. The log storage module 135 may be configured to append data packets 110 sequentially within the physical address space of the respective sections of the storage medium 140 (by use of the storage controller 139). The relative position of data packets 110 within a section may determine the relative order of the data packets 110 within the section. The order of the sections of the storage medium 140 may be determined by use of, inter alia, sequence information 113 of the sections. The sequence information 113 may be assigned to respective sections of the storage medium 140 when the sections are initialized for use (e.g., erased), programmed, closed, and/or the like, such that the sequence information 113 defines an ordered sequence of sections within the storage address space 144. Accordingly, the order of a data packet 110 within the storage log may be determined by: a) the relative position of the data packet 110 within a particular storage division and b) the order of the storage division relative to other storage divisions in the storage address space 144.

In some embodiments, the storage layer 130 may be configured to manage an asymmetric, write-once storage medium 140, such as a solid-state storage medium, flash storage medium, or the like. As used herein, a "write-once" storage medium refers to a storage medium that can only be reliably programmed once, and/or must be reinitialized (e.g., erased) each time new data is written or programmed thereon. A write-once storage medium may, therefore, comprise a "writeable," "initialized," or "erased" state in which the storage medium is capable of having data programmed thereon, and a "written state" in which the storage medium has had data programmed thereon and, as such, must be erased before being used to store new data. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage medium 140 may be partitioned into storage divisions that can be erased as a group (e.g., erase blocks). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage layer 130 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

The storage layer 130 may be configured to perform storage operations out-of-place by use of, inter alia, the log storage module 135. The log storage module 135 may be configured to append data at a current append point within the storage address space 144 in a manner that maintains the relative order of storage operations performed by the storage layer 130, forming a "storage log" on the storage medium 140. As used herein, a "storage log" refers to a data storage configuration configured to define a relative order of storage operations performed on the storage medium 140.

The storage layer 130 may further comprise a media management module 136 configured to manage storage resources of the storage medium 140. The media management module 136 may be configured to reclaim storage resources of the storage device 141 that comprise invalid and/or obsolete data. The media management module 136 may be further configured to manage grooming operations, such as wear leveling, data refresh, data reliability, and the like. As disclosed above, the storage device 141 may comprise a write-once storage medium 140; the media management module 136 may be configured to initialize storage divisions for use by the log storage module 135 (e.g., put storage divisions into a writeable state). Reclaiming a storage division may comprise, inter alia, relocating valid data stored on the storage division (if any), and erasing the storage division. The media management module 136 may be configured to maintain a queue of writeable storage divisions (e.g., storage divisions that have been reclaimed and/or erased).

The storage layer 130 may further comprise a reserve module 138 configured to adapt the reserve capacity on the storage medium 140 in response to operating conditions on the storage layer 130 (e.g., to manage a write capacity of the storage medium 140). As used herein, the "write capacity" of the storage layer 130 refers to the amount of storage divisions that are in a writeable state (e.g., have been erased and/or initialized). The current write capacity available to the storage layer 130 may be based on, inter alia, the number of writeable storage divisions available on the storage medium 140. The write capacity may differ from the full physical storage capacity of the storage device 141. As disclosed in further detail herein, the reserve module 138 may be configured to dynamically modify a write capacity reserve on the storage medium 140 to prevent write stall conditions.

As disclosed in further detail herein, the storage layer 130 may be configured to perform storage operations "out-of-place" within the storage address space 144 of the storage device 141 in order to, inter cilia, address asymmetric properties of the storage medium 140. In some embodiments, the storage layer 130 may be configured to append data to a storage log, by use of the log storage module 135. The append-only, write-out-of-place storage paradigm of the storage layer 130 may leverage a reserve capacity of initialized storage divisions to operate efficiently.

Figure 2:
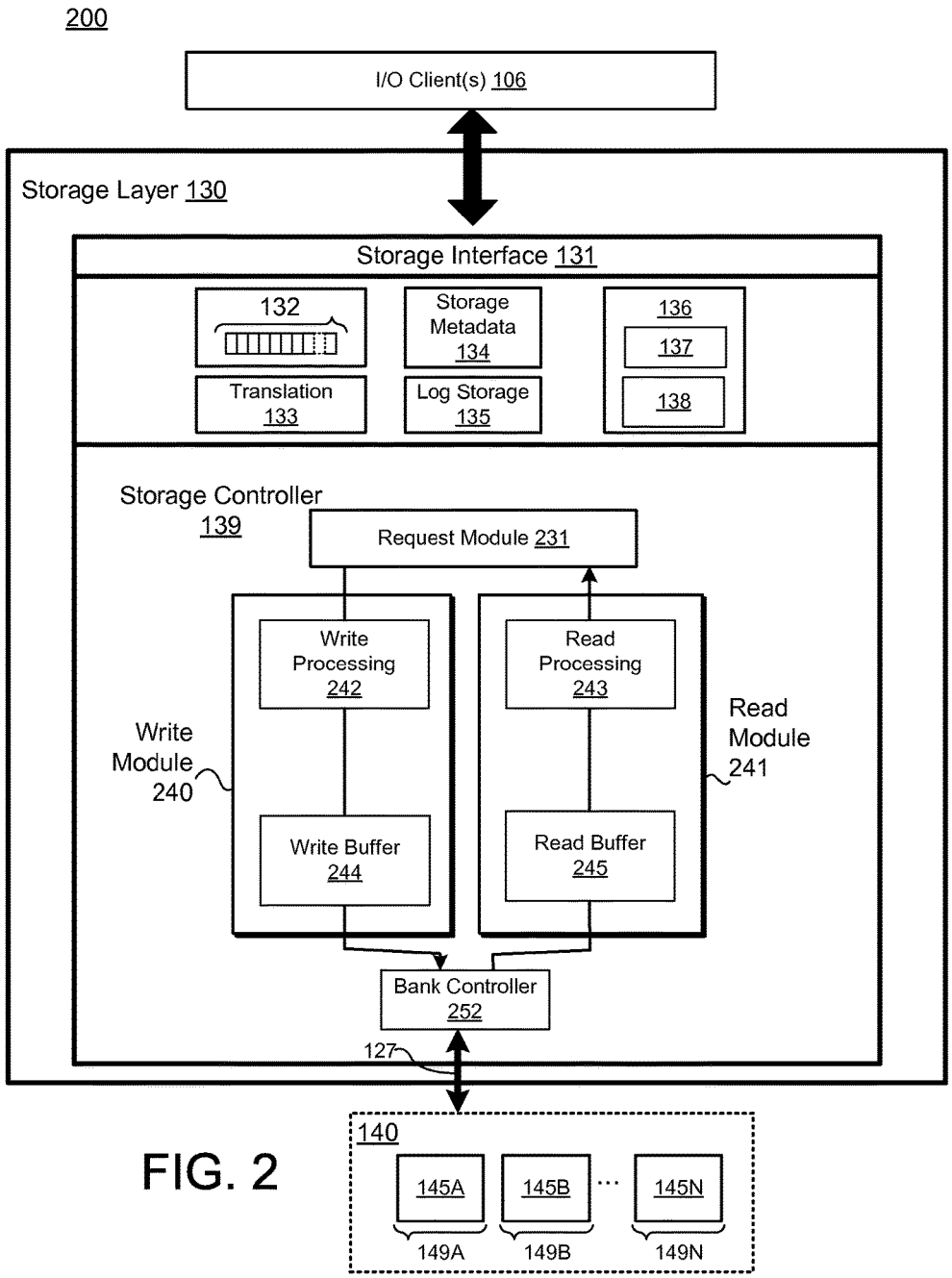
FIG. 2 is a block diagram of another embodiment of a storage system.

FIG. 2 depicts another embodiment of a system 200 comprising a storage layer 130. In the FIG. 2 embodiment, the storage medium 140 may comprise a plurality of independent banks 149A-N, each of which may comprise one or more storage arrays 145A-N, as disclosed above.

The storage controller 139 may comprise a storage request receiver module 231 configured to receive storage requests from the storage layer 130 via an interconnect 127. The storage request receiver module 231 may be further configured to transfer data to/from the storage layer 130 and/or I/O clients 106. Accordingly, the storage request receiver module 231 may comprise one or more direct memory access (DMA) modules, remote DMA modules, bus controllers, bridges, buffers, and so on.

The storage controller 139 may comprise a write module 240 that is configured to store data on the storage medium 140 in response to requests received via the storage request receiver module 231. The storage requests may comprise and/or reference the logical interface of the data pertaining to the requests. The write module 240 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data). The write module 240 may comprise a write processing module 242 configured to process data for storage. Processing data fir storage may comprise one or more of: a) compression processing, b) encryption processing, c) encapsulating data into respective data packets 110 (and/or other containers), d) performing error-correcting code (ECC) processing, and so on. A write buffer 244 may be configured to buffer data for storage on the storage medium 140. In some embodiments, the write buffer 244 may comprise one or more synchronization buffers configured to synchronize a clock domain of the storage controller 139 with a clock domain of the storage medium 140 (and/or interconnect 127).

The log storage module 135 may be configured to select storage location(s) for data storage operations and may provide addressing and/or control information to the storage arrays 145A-N of the independent banks 149A-N. The log storage module 135 may be configured to append data sequentially in a log format within the storage address space 144 of the storage medium 140, as disclosed herein.

Storage operations to write data on the storage medium 140 may comprise: a) appending one or more data packets to the storage log on the storage medium 140 and b) updating storage metadata 134 to associate LID(s) of the data with the storage addresses of the one or more data packets. In some embodiments, the storage metadata 134 may be maintained on memory resources of the storage controller 139 (e.g., on dedicated volatile memory resources of the storage device 141 comprising the storage medium 140). Alternatively, or in addition, portions of the storage metadata 134 may be maintained within the storage layer 130 (e.g., on a volatile memory 102 of the computing device 110 of FIG. 1A). In some embodiments, the storage metadata 134 may be maintained in a volatile memory by the storage layer 130, and may be periodically stored on the storage medium 140.

The storage controller 139 may further comprise a data read module 241 configured to read data from the storage log on the storage medium 140 in response to requests received via the storage request receiver module 231. The requests may comprise LID(s) of the requested data, a storage address of the requested data, and/or the like. The read module 241 may be configured to: a) determine the storage address(es) of the data packet(s) 110 comprising the requested data by use of, inter alia, the forward map 160, b) read the data packet(s) 110 from the determined storage address(es) on the storage medium 140, and c) process data for use by the requesting entity. Data read from the storage medium 140 may stream into the read module 241 via a read buffer 245. The read buffer 245 may comprise one or more read synchronization buffers for dock domain synchronization, as described above. A read processing module 243 may be configured to processes data read from the storage medium 140, which may include, but is not limited to, one or more of: a) decompression processing, b) decryption processing, c) extracting data from one or more data packet(s) 110 (and/or other containers), d) performing ECC processing, and so on.

The storage controller 139 may further comprise a bank controller 252 configured to selectively route data and/or commands of the write module 240 and/or read module 241 to/from particular independent banks 149A-N. In some embodiments, the storage controller 139 is configured to interleave storage operations between the independent banks 149A-N. The storage controller 139 may, for example, read from the storage array 145A of bank 149A into the read module 241 while data from the write module 240 is being programmed to the storage array 14513 of bank 149B. Further embodiments of multi-bank storage operations are disclosed in U.S. patent application Ser. No. 11/952,095, entitled, "Apparatus, System, and Method for Managing Commands for Solid-State Storage Using Bank Interleave," filed Dec. 12, 2006 for David Flynn et al., which is hereby incorporated by reference in its entirety.

The write processing module 242 may be configured to encode data packets 110 into ECC codewords. As used herein, an ECC codeword refers to data and corresponding error detection and/or correction information. The write processing module 242 may be configured to implement any suitable FCC algorithm and/or generate FCC codewords of any suitable type, which may include, but are not limited to, data segments and corresponding ECC syndromes, ECC symbols, ECC chunks, and/or other structured and/or unstructured ECC information. FCC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more packets. Alternatively, the write processing module 242 may be configured to generate arbitrarily sized ECC codewords. Further embodiments of error-correcting code processing are disclosed in U.S. patent application Ser. No. 13/830,652, entitled, "Systems and Methods for Adaptive Error-Correction Coding," filed Mar. 14, 2013 for Jeremy Fillingim et al, which is hereby incorporated by reference in its entirety.

Figure 3A:
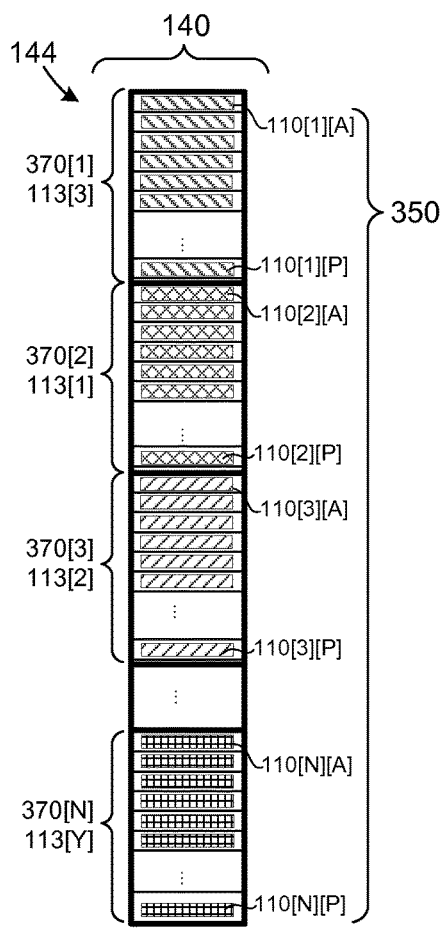
FIG. 3A depicts one embodiment of a storage log of a storage layer.
Figure 3A:
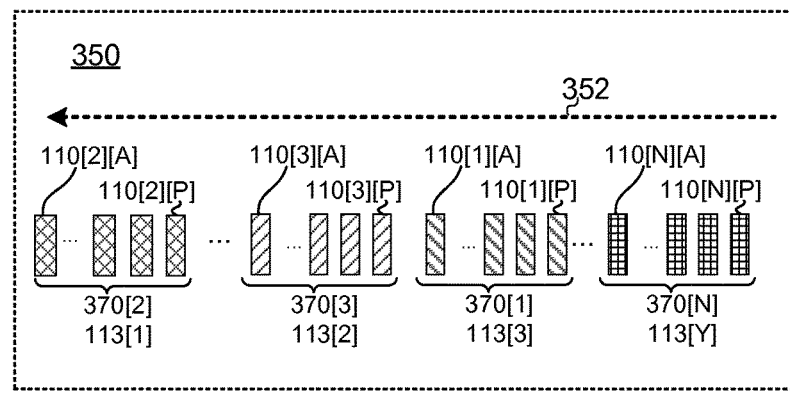

As disclosed, herein, the storage layer 130 may be configured to manage an asymmetric, write-once storage medium 140 by, inter alia, storing data sequentially within the storage address space 144 (e.g., writing data out-of-place, in a contextual, log-based storage format). FIG. 3A depicts one embodiment 300A of data stored sequentially within the storage address space 144 of the storage medium 140 by the storage layer 130. The storage log 350 may comprise data stored with persistent metadata configured to determine a log order 352 of the data (e.g., log order 352 of packets 110[A][0]-110[N][P]). The tog storage module 135 may be configured to append data packets 110 sequentially within the storage address space 144 (e.g., within storage divisions 370[1]-370[N]), by use of, inter cilia, the storage controller 139. The log storage module 135 may be configured to fill the respective storage divisions 370[1]-370[N] before appending data to other storage divisions. The order in which data is appended to the respective storage divisions 370[1]-370[N] in the storage address space 144 may be determined according to the availability of erased and/or initialized storage divisions 370[1]-370[N], as disclosed in further detail herein.

In the FIG. 3A embodiment, the log storage module 135 may have stored data packets 110[1][A]-110[1][P] sequentially within the storage address space of storage division 370[1], such that data packet 110[1][P] is later in the storage log (stored more recently) relative to data packet 110[1][A].

FIG. 3A further illustrates data packets 110 stored sequentially within other storage divisions 370[2]-370[N]: data packets 110[2][A]-110[2][P] are stored sequentially within storage division 370[2], data packets 110[3][A]-1110[3][P] are stored sequentially within storage division 370[3], data packets 110[N][A]-110[N][P] are stored sequentially within storage division 370[N], and so on.

As disclosed herein, the storage layer 130 may mark the storage divisions 370[1]-370[N] with respective sequence information 113[1]-113[Y] configured to define the order in which the storage divisions 370[1]-370[1]-370[N] were programmed. Accordingly, the order in which the data packets 110[1][A]-110[N][P] were stored within the respective storage divisions 370[1]-370[N] may be defined by, inter alia, sequence information 113[1]-113[Y] of the storage divisions 370[1]-370[N]. In some embodiments, sequence information 113[1]-113[Y] may be stored at predetermined locations within the storage divisions 370[1]-370[N] (e.g., in a header, at a predetermined offset, or the like). The respective sequence information 113[1]-113[Y] may be stored on the storage divisions 370[1]-370[N] when the storage divisions 370[1]-370[N] are initialized (e.g., erased) by the media management module 136, selected for use by the log storage module 135, and/or placed in a write queue by the media management module 136; when data is appended to the storage divisions 370[1]-370[N]; when the storage divisions 370[1]-370[N] are closed; and/or the like.

In the FIG. 3A embodiment, the sequence information 113[Y] may correspond to the most recent (youngest) storage division 370[1]-370[N] of the storage log 350, and the sequence information 113[1] may correspond to the earliest (oldest) storage division 370[1]-370[N] of the storage log. Therefore, and as illustrated in FIG. 3A, the log order 352 of the storage divisions 370[1]-370[N] may be 370[N] (most recent), 370[1], 370[3], and 370[2] (oldest). The order of the individual data packets 110[1][A]-110[N][P] within the storage log 350 may be determined based on the sequence information 113[1]-113[Y] of the storage divisions 370[1]-370[N] and the relative storage location(s) of the data packets 110[1][A]-110[N][P] within the storage divisions 370[1]-370[N]. In the FIG. 3A embodiment, the log order 352 from most recent to oldest is: 110[N][P]-110[N][A], 110[1][P]-110[1][A], 110[3][P]-110[3][A], and 110[2][P]-110[2][A].

Figure 3B:
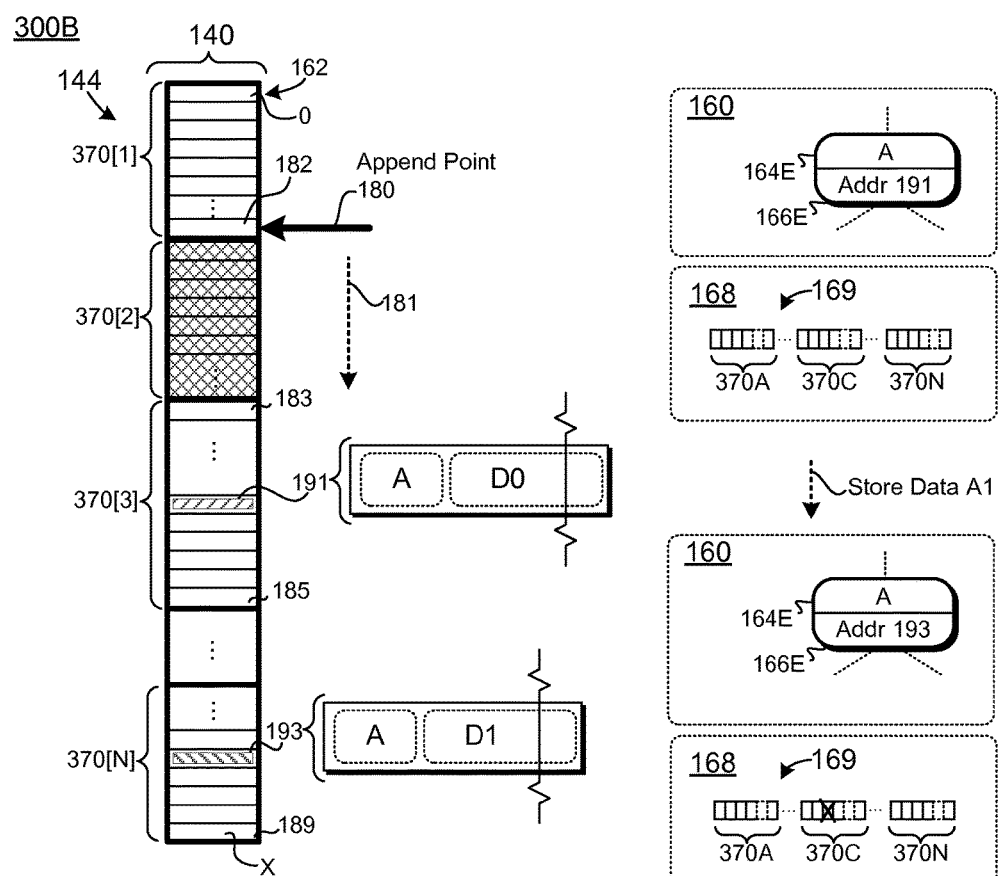
FIG. 3B depicts one embodiment of sequential storage operations of a storage layer.

FIG. 3B depicts one embodiment 300B of storage operations, performed by the storage layer 130, configured to append data to an ordered storage log 350. As disclosed herein, the storage address space 144 may comprise a plurality of storage divisions 370[1]-370[N] (e.g., erase blocks, logical erase blocks, or the like), each of which can be initialized for use in storing data (e.g., erased). The storage divisions 370[1]-370[N] may comprise respective storage locations, which may correspond to banks 149A-N, storage arrays 145A-N, pages, logical pages, blocks, sectors, and/or the like, as disclosed herein. The storage locations may be assigned respective storage addresses within the storage address space 144 (e.g., storage address 0 of storage division 370[1] through storage address X of storage division 370[N]).

The log storage module 135 may be configured to store data sequentially within respective storage divisions 370[1]-370[N], by use of the storage controller 139. The log storage module 135 may be configured to sequentially append data packets 110 at a current append point 180 within the storage address space 144. In the FIG. 3B embodiment, the current append point 180 corresponds to storage location 182 of storage division 370[1]. The log storage module 135 may be configured to sequentially increment the append point 180 within the storage division 370[1] until the storage division 370[1] is fully programmed (and/or filled within a threshold or boundary condition).

In response to filling the storage division 370[1], the log storage module 135 may be configured to advance 181 the append point 180 to a next available storage location (e.g., a next available storage division 370[1]-370[N]). As used herein, an "available" storage location refers to a storage location that is "writeable" and/or in a "writeable state." As used herein, a storage location that is in a writeable state refers to a storage location that has been initialized and has not yet been programmed (e.g., has been erased). As disclosed above, some types of storage media can only be reliably programmed once after erasure. Accordingly, a writeable storage location may refer to a storage location and/or storage division 370[1]-370[N] that is erased. Conversely, storage locations that have been programmed and/or are not initialized are in an "un-writeable" state. Advancing 181 the append point 180 may comprise selecting a writeable storage division 370[2]-370[N]. As disclosed in further detail herein, in some embodiments, advancing 181 the append point 180 to the next available storage location may comprise selecting a storage division 370[1]-370[N] from a queue of available storage divisions 370[1]-370[N] (a write queue 337, as disclosed in conjunction with FIG. 3C below).

In the FIG. 3B embodiment, the storage division 370[2] may be unavailable for use by the log storage module 135 (e.g., un-writeable) due to, inter alia, not being in an erased state, being out-of-service due to high error rates, or the like. Therefore, after filling the storage location 182, the log storage module 135 may skip the unavailable storage division 370[2] and advance 181 the append point 180 to the next available storage division 370[3]. The log storage module 135 may be configured to continue appending data to storage locations 183-185, after which the append point 180 is advanced to a next available storage division 370[1]-370[N], as disclosed herein.

Figure 3C:
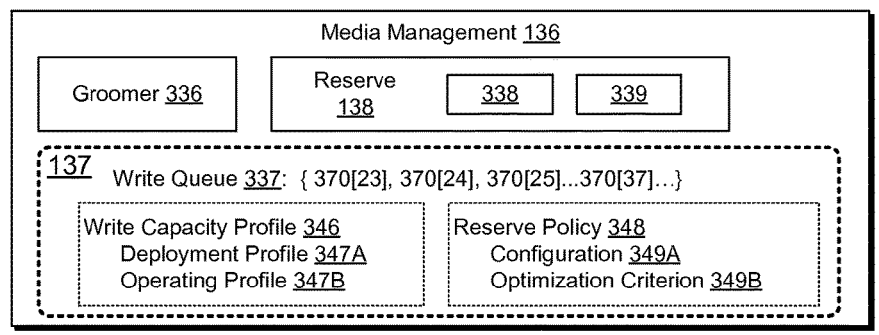
FIG. 3C depicts one embodiment of a media management module comprising a reserve module.
Figure 3C:
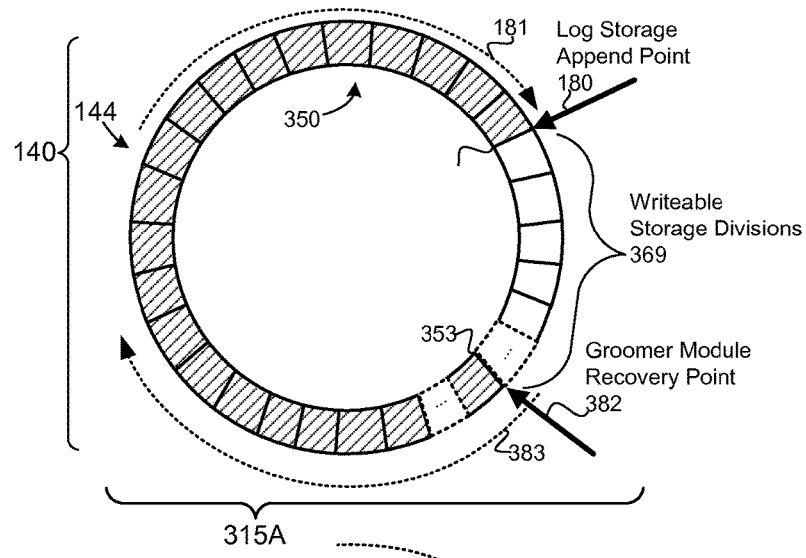
Figure 3C:
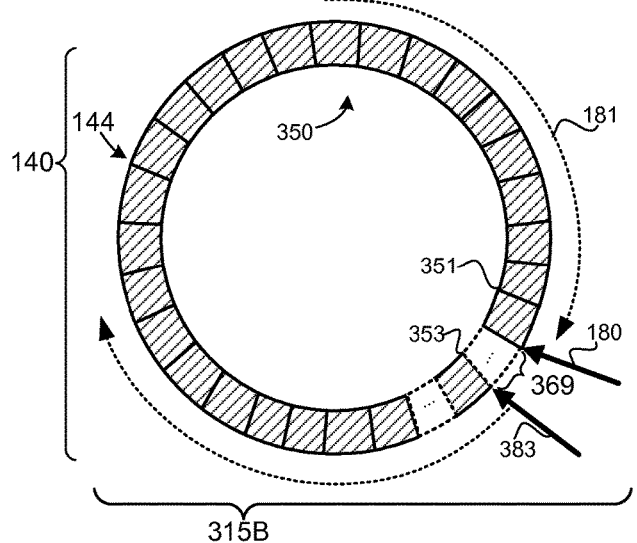

After storing data on the "last" storage location within the storage address space 144 (e.g., storage location 189 of storage division 370[N]), the log storage module 135 may advance 181 the append point 180 by wrapping back to the first storage division 370[1] (or the next available storage division, if storage division 370[1.] is unavailable). Accordingly, the storage layer 130 may be configured to manage the storage address space 144 as a loop or cycle (e.g., as illustrated in FIG. 3C).

As disclosed herein, the log storage module 135 may be configured to append data sequentially, in a format configured to define a storage log 350 on the storage medium 140. The log storage format implemented by the storage layer 130 may be used to modify and/or overwrite data out-of-place. Performing storage operations out-of-place may avoid write amplification, since existing valid data on the storage divisions 370[1]-370[N] comprising the data that is being modified and/or overwritten need not be erased and/or recopied. Moreover, writing data out-of-place may remove erasure from the latency path of many storage operations (the erasure latency may not be a part of the timing path of write operations).

In the FIG. 3B embodiment, a data segment D0 corresponding to LID A may be stored at storage location 191. The data segment D0 may be stored in association with persistent metadata (e.g., in the packet format 110, disclosed above). The data segment 112 of the packet 110 may comprise the data segment D0, and the persistent metadata 114 may comprise the LID(s) associated with the data segment (e.g., LID A). An I/O client 106 may request an operation to modify and/or overwrite the data associated with the LID A, which may comprise replacing the data segment D0 with data segment D1. The storage layer 130 may perform this operation out-of-place by appending a new packet 110 comprising the data segment D1 at a different storage location 193 on the storage medium 140, rather than modifying the existing data in place, at storage location 191. The storage operation may further comprise updating the storage metadata 134 to associate the LID A with the storage address of storage location 193 and/or to invalidate the obsolete data D0 at storage location 191. As illustrated in FIG. 3B, updating the storage metadata 134 may comprise updating an entry of the forward map 160 to associate the LID A 164E with the storage address of the modified data segment D1. Updating the storage metadata 134 may further comprise updating one or more reverse indexes and/or validity bitmaps, as disclosed in further detail herein.

Performing storage operations out-of-place (e.g., appending data to the storage log) may result in obsolete and/or invalid data remaining on the storage medium 140 (e.g., data that has been erased, modified, and/or overwritten out-of-place). As illustrated in FIG. 3B, modifying the data of LID A by appending the data segment D1 to the storage log rather than overwriting and/or replacing the data segment D0 in place at storage location 191 results in keeping the obsolete version of the data segment D0 on the storage medium 140. It may not be efficient to immediately remove the obsolete version of the data segment D0 since, as disclosed above, erasing the data segment D0 may involve erasing an entire storage division 370[1] and/or relocating valid data on the storage division 370[1]. As such, over time, the storage medium 140 may accumulate a significant amount of obsolete and/or "invalid" data. As used herein, "invalid" data refers to data that does not need to be retained on the storage medium 140, which may include data modified and/or overwritten in subsequent storage operations, data corresponding to deallocated LIDs, data erased by an I/O client 106, and/or the like.

In some embodiments, the storage layer 130 is configured to maintain storage metadata 134 comprising a reverse index 168. The reverse index 168 may be configured to, inter alia, identify invalid data within the storage divisions 370[1]-370[N] of the storage medium 140. The reverse index 168 may correspond to the storage address space 144 of the storage medium 140. In some embodiments, the reverse index 168 comprises one or more validity bitmaps comprising entries 169 configured to identify storage locations comprising invalid data. The reverse index 168 may be further configured to maintain information pertaining to the storage location(s) and/or storage division(s) 370[1]-370[N], including, but not limited to: wear level, reliability characteristics (e.g., error rate), performance characteristics (e.g., read time, write time, erase time, and so on), data age (e.g., time since last program operation, refresh, or the like), read disturb count, write disturb count, and so on. In the FIG. 3B embodiment, storing the data segment D1 of LID A at storage location 193 renders data segment D0 at storage location 191 obsolete. In response, the storage layer 130 may be configured to mark the entry 169 associated with storage location 191 as invalid to indicate that the storage location 191 comprises data that does not need to be retained on the storage medium 140.

The storage layer 130 may be configured to reconstruct the storage metadata 134, including the forward map 160, by use of contents of the storage log on the storage medium 140. In the FIG. 3B embodiment, the current version of the data associated with LID A may be determined based on the relative log order of the data packets 110 at storage locations 191 and 193. Since the data packet at storage location 193 is ordered after the data packet at storage location 191 in the storage log 350, the storage layer 130 may determine that storage location 193 comprises the most recent, up-to-date version of the data corresponding to LID A. The storage layer 130 may reconstruct the forward map 160 to associate the LID A with the data packet at storage location 193 (rather than the obsolete data at storage location 191). The storage layer 130 may be further configured to mark the storage location 193 as comprising invalid data that does not need to be retained on the storage medium 140.

As disclosed above, the storage layer 130 may comprise a media management module 136 configured to reclaim storage resources occupied by invalid data and/or prepare storage divisions 370[1]-370[N] for use by the log storage module 135. The media management module 136 may be further configured to perform other media management operations including, but not limited to, refreshing data stored on the storage medium 140 (to prevent error conditions due to data degradation, write disturb, read disturb, and/or the like), monitoring media reliability conditions, and/or the like.

In some embodiments, the media management module 136 is configured to operate as a background process, outside of the critical path for servicing storage requests of the I/O clients 106. The media management module 136 may identify storage divisions 370[1]-370[N] to reclaim by use of the storage metadata 134 (e.g., the reverse index 168). As used herein, reclaiming a storage resource, such as a storage division 370[1]-370[N], refers to erasing the storage division 370[1]-370[N] so that new data may be stored/programmed thereon. The storage layer 130 may identify storage divisions 370[1]-370[N] to reclaim based on one or more factors, which may include, but are not limited to, the amount of invalid data stored on the storage division 370[1]-370[N], the amount of valid data in the storage division 370[1]-370[N], wear levels of the storage division 370[1]-370[N] (e.g., number of program/erase cycles), time since the storage division. 370[1]-370[N] was programmed and/or refreshed, the relative order of the storage division 370[1]-370[N] within the storage log 350, and so on. The media management module 136 may identify invalid data on the storage medium 140, such as the data segment D0 at storage location 191, by use of the storage metadata 134 (e.g., the reverse index 168 and/or forward map 160). The media management module 136 may determine that storage locations that are not associated with valid identifiers (LIDs) in the forward map 160 and/or are marked invalid in the reverse map 168 comprise invalid data that does not need to be retained on the storage medium 140.

As used herein, a storage recovery operation to reclaim a storage division 370[1]-370[N] may comprise: a) identifying valid data stored on the storage division 370[1]-370[N] (by use of the storage metadata 134), b) relocating the identified data to other storage locations, and c) initializing the storage division 370[1]-370[N] (e.g., erasing the storage division 370[1]-370[N]). Initializing the storage division 370[1]-370[N] may further comprise marking the storage division 370[1]-370[N] with sequence information 113 configured to identify an order of the storage division 370[1]-370[N] within the storage log 350, as disclosed herein. Further embodiments of systems and methods for reclaiming storage resources are disclosed in U.S. Pat. No. 8,402,201, entitled "Apparatus, System, and Method for Storage Space Recovery in Solid-State Storage," issued on Mar. 19, 2013 to David Flynn et al., which is hereby incorporated by reference in its entirety.

FIG. 3C is a block diagram of one embodiment 300C of a media management module 136 of the storage layer 130. The media management module 136 may comprise a groomer module 336 configured to manage grooming operations on the storage medium 140, which may include reclaiming storage divisions 370[1]-370[N], as disclosed herein. The media management module 136 may be further configured to write capacity metadata 137, which may include a write queue 337 configured to identify storage divisions 370[1]-370[N] that are in a writeable state (e.g., storage divisions 370[1]-370[N] that have been erased and/or initialized). The media management module 136 may place storage divisions 370[1]-370[N] into the write queue 337 in response to recovering and/or initializing the storage divisions 370[1]-370[N], by use of the groomer module 336. The log storage module 135 may access the write queue 337 to advance the append point 180 within the storage log 350, as disclosed above. The write capacity metadata 137 may be maintained with the storage metadata 135 and/or in separate metadata storage.

The number of storage divisions 370[1]-370[N] in the write queue 337 may determine the amount of write capacity currently available to the storage layer 130. As used herein, "write capacity" refers to the amount of storage capacity that is currently available for performing write operations (e.g., capacity that is in a writeable state). Accordingly, the write capacity may correspond to the number of storage divisions 370[1]-370[N] that are currently in a writeable state. The write capacity may differ from the amount of "free" physical storage capacity on the storage medium 140. As used herein, "free" physical storage capacity refers to physical storage capacity that is not currently in use to store valid data. "Used" or "occupied" physical storage capacity refers to physical storage capacity that is currently being used to store valid data. As disclosed above, the storage layer 130 may be configured to write data out-of-place due to the asymmetric, write-once properties of the storage medium 140. Accordingly, data that is invalid and/or obsolete may remain on the storage medium 140 until removed in a reclamation operation. The storage resources that are occupied by invalid data (and/or are in a non-writeable state) represent storage capacity that could be used to store other, valid data, but are not available to do so until they are re-initialized by the groomer module 336 (e.g., erased).

Referring back to FIG. 3B, after storing D1 at storage location 193, the storage location 193 represents "used" physical storage capacity (e.g., storage resources occupied by valid data). The storage location 191, however, comprises invalid data and, as such, represents "free" physical storage capacity, which is not currently available for use. Although storage location 191 is "free," the storage location 191 is not usable for write operations until the corresponding storage division 370[3] is recovered. Therefore, although the storage location 191 represents "free" space on the storage medium 140, the storage location 191 does not contribute to the available write capacity of the storage medium 140 until it is re-initialized.

Referring again to FIG. 3C, the groomer module 336 may be configured to identify and reclaim storage resources for use by the media management module 136. As illustrated in state 315A, the groomer module 336 may iterate over the storage divisions 370[1]-370[N] comprising the storage log 350, to identify storage divisions 370[1]-370[N] suitable for recovery. As disclosed above, the groomer module 336 may be configured to select storage divisions 370[1]-370[N] for recovery based on the amount of invalid data on the storage divisions 370[1]-370[N], the last program time of the storage divisions, reliability metrics, and the like. The groomer module 336 may be configured to evaluate storage divisions 370[1]-370[N] at a current recovery point 382 within the storage address space 144. The recovery point 382 may correspond to a "tail" region 353 of the storage log 350. As used herein, the tail of the storage log 350 refers to storage divisions 370[1]-370[N] ordered after other, younger storage divisions in the storage log 350 (e.g., storage division 370[2] of FIG. 3A). Conversely, the "head" region 351 of the storage log 350 refers to data that was recently appended to the storage log 350. The groomer module 336 may be configured to evaluate and/or reclaim older storage divisions 370[1]-370[N] in the storage log 350 before evaluating and/or reclaiming more recent storage divisions 370[1]-370[N]. The groomer module 336 may, therefore, be configured to traverse the storage address space 144 of the storage log 350 in reverse log order 383 (e.g., from older to more recent).

As illustrated in state 315A, the groomer module 336 may be configured to schedule storage recovery operations at a rate configured to ensure that the log storage module 135 has sufficient write capacity to efficiently satisfy write requests of the I/O clients 106. Accordingly, the groomer module 336 may be configured to schedule storage reclamation operations to occur at a similar rate to which the log storage module 135 is appending data to the storage medium 140 at the append point 180. Accordingly, the log storage module 135 may have available, writeable storage divisions 369 in the write queue 337 for use in satisfying write requests from the I/O clients 106.

As disclosed above, storage recovery operations may be high-latency as compared to read and/or write operations (e.g., it may take 10 to 100 times longer to erase a storage division 370[1]-370[N] than to read and/or program data to the storage division 370[1]-370[N]). Moreover, the groomer module 336 may be configured to reclaim storage resources in the background, and as such, may suspend such operations while other storage requests are being serviced by the storage layer 130. As illustrated in state 315B, in response to write-intensive workloads involving large numbers of write requests and/or requests to write large amounts of data, the log storage module 135 may consume the available write capacity of the storage device 141 (e.g., consume large numbers of the writeable storage divisions 369). The groomer module 336 may be unable to keep up with the demand for write capacity, such that the log storage module 135 exhausts the capacity of writeable storage divisions 369 in the write queue 337.

In response to exhausting the write capacity of the storage device 141 (and/or exceeding a write capacity threshold), the storage layer 130 may enter a "write stall" state. In a write stall state, the storage layer 130 may be configured to stall write operations until additional write capacity is made available (e.g., until the groomer module 336 reclaims additional write capacity by, inter alia, reclaiming storage divisions 370[1]-370[N], as disclosed herein). Storage recovery operations may be complicated due to the lack of available write capacity (e.g., it may be difficult to relocate valid data from the storage divisions 370[1]-370[N] that are being reclaimed). In some embodiments, the media management module 136 may be configured to maintain a threshold amount of write capacity in order to perform grooming operations. The relocation write capacity threshold may correspond to an amount of write capacity available to relocate valid data on storage divisions 370[1]-370[N] that are being reclaimed. Relocation capacity may be equivalent to one or more storage divisions 370[1]-370[N] and/or a portion of a storage division 370[1]-370[N] (e.g., using a garbage collection bypass, as disclosed in U.S. Pat. No. 8,402,201, which is incorporated herein).

The media management module 136 may be configured to prevent write stall conditions. In some embodiments, the media management module 136 is configured to increase the priority of the storage recovery operations of the groomer module 336 in response to determining that the available write capacity is less than a threshold value. Increasing the priority of the storage recovery operations may comprise allowing the recovery operations to preempt other storage operations and/or requests being serviced by the storage layer 130 (e.g., configure the groomer module 336 to operate in the foreground).

Alternatively, or in addition, the media management module 136 may comprise a reserve module 138 configured to over-provision storage resources of the storage device 140. As used herein, "over-provisioning" refers to allocating, designating, reserving, and/or provisioning storage resources of the storage medium 140 for use as, inter alia, additional write capacity. Over-provisioning may comprise designating a portion of the physical storage capacity available on the storage medium 140 as reserve capacity. As used herein, the "physical storage capacity" of the storage medium 140 refers to the storage capacity of the storage address space 144 of the storage medium 140. The physical storage capacity may exclude portions of the storage medium 140 that are not accessible to I/O clients 106 (and/or the storage layer 130), such as portions of the storage medium 140 designated for use as replacements for failed storage divisions, dedicated metadata storage locations and/or channels, and the like.

Figure 3D:
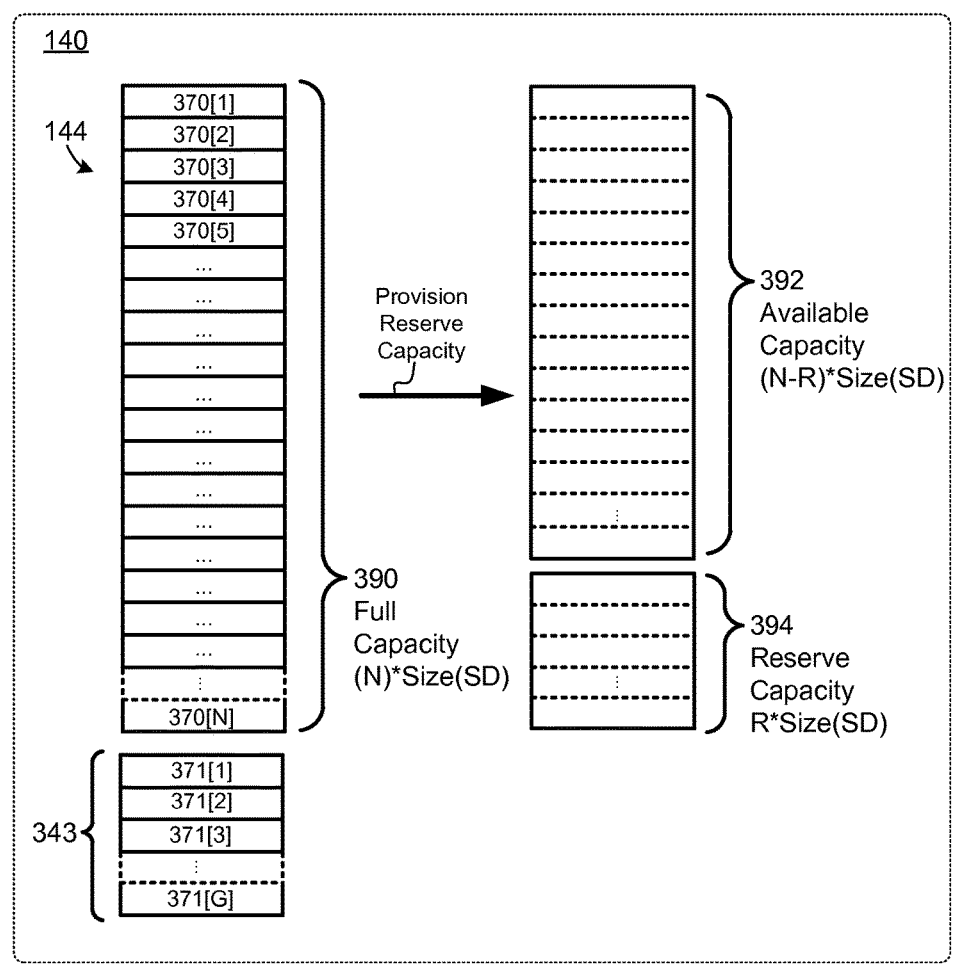
FIG. 3D depicts embodiments of dynamic storage capacity reservations.

FIG. 3D depicts one embodiment 300D of storage capacity reservations of a media management module 136. As illustrated in FIG. 3D, the storage medium 140 may comprise a storage address space 144 used to store data of the I/O clients 106 by use of, inter alia, the storage layer 130 as disclosed herein. The storage medium 140 may further comprise auxiliary storage divisions 371[1]-371[G] for use as replacements for failed and/or unreliable storage divisions 370[1]-370[N]. In some embodiments, storage divisions 371[1]-371[X] in the auxiliary region 343 may be mapped into the storage address space in response to storage division failure conditions. Embodiments of apparatus, systems, and methods for managing failure conditions are disclosed in U.S. Pat. No. 8,195,978, entitled "Apparatus, System, and Method for Detecting and Replacing a Failed Data Storage," issued Jun. 5, 2012, which is hereby incorporated by reference in its entirety. The physical storage capacity of the storage medium 140 may correspond to the number of useable storage divisions 370[1]-370[N] in the storage address space 144. In the FIG. 3D embodiment, the storage medium 140 comprises N storage divisions 370[1]-370[N] and the physical storage capacity of the storage medium 140 is N times the storage capacity of the respective storage divisions 370[1]-370[N].

The storage layer 130 may be configured to determine the amount of physical address space that is currently in use to store data of the I/O clients 106. As disclosed above, "occupied" or "used" physical storage capacity refers to the physical storage capacity that is currently being used to store valid data (e.g., is occupied by valid data). "Free" or "unoccupied" physical storage capacity refers to storage capacity that is not currently being used to store valid data. Physical storage occupancy may be determined by use of the forward map 160 (and/or other storage metadata 134). The assignments between LIDs and storage locations in the forward map 160 may represent physical storage capacity that is in use to store valid data. The used physical storage capacity of the storage medium 140 may, therefore, be determined by summing and/or combining the storage locations referenced in the forward map 160, in some embodiments, the media management module 136 is configured to maintain usage information for the storage medium 140 (e.g., a running total of the occupied physical storage capacity on the storage medium 140). Further embodiments for managing physical storage resources of a storage medium are disclosed in U.S. patent application Ser. No. 12/879,004, entitled "Apparatus, System, and Method for Allocating Storage," filed Sep. 9, 2010 for Jonathan Thatcher et al., which is hereby incorporated by reference in its entirety.

As disclosed above, the "free" or "unoccupied" storage capacity of the storage medium 140 may not be usable for write operations until the corresponding storage divisions 370[1]-370[N] are re-initialized. Therefore, existence of free storage capacity on the storage medium 140 may not guarantee that the storage layer 130 will be capable of servicing write requests without first recovering storage resources on the storage device 141 (e.g., in a write stall condition). Accordingly, in some embodiments, the reserve module 138 may over-provision storage resources by reserving a portion of the physical storage capacity of the storage medium 140 (e.g., as free storage divisions 370[1]-370[N] available for relocation and/or write operations). The storage layer 130 may manage the storage medium 140 as having less physical storage capacity than the full physical storage capacity 390 available on the storage medium 140. As depicted in FIG. 3D, the reserve module 138 may assign storage space equivalent to one or more storage divisions 370[1]-370[N] as over-provisioned, reserve capacity 394. The remaining storage space may be available storage capacity 392. In the FIG. 3D embodiment, the reserve module 138 may provision reserve capacity 394 equivalent to R storage divisions 370[1]-370[N]. The remaining storage capacity equivalent to N-R storage divisions 370[1]-370[N] may be provisioned as available storage capacity 392 of the storage layer 130. In other embodiments, the reserve module 138 may be configured to provision reserve capacity 394 as a percentage and/or proportion of the full storage capacity 390 of the storage medium 140 (e.g., 20 percent of the full capacity 390).

The reserve capacity 394 may not correspond to specific storage divisions 370[1]-370[N] within the storage address space 144; all of the storage divisions 370[1]-370[N] may remain available to the storage layer 130 for performing storage and/or grooming operations. The storage layer 130 may, however, treat the storage medium 140 as being at "full" capacity in response to filling the equivalent of the available capacity 392. In some embodiments, the storage layer 130 may report the available capacity 392 as the full storage capacity of the storage device 141 through, inter alia, the storage interface 131. Accordingly, I/O clients 106 may view the storage layer 130 as providing the available capacity 392 as opposed to the full capacity 390.

In one embodiment, for example, the storage medium 140 may have a physical storage capacity of 160 GB. The reserve module 138 may over-provision the 160 GB, by designating 32 GB as reserved capacity 394, and 128 GB as available storage capacity 392. The storage layer 130 may, therefore, treat the storage medium 140 as having a storage capacity of 128 GB. The 32 GB of reserved capacity 394 may be leveraged as write and/or relocation capacity by the media management module 136, as disclosed herein. The media management module 136 may leverage the reserve capacity 392 to provide additional write capacity for the log storage module 135 and/or for use by the groomer module 336 for media management and grooming operations, such as storage recovery (e.g., garbage collection), data refresh, reliability management, wear leveling, and the like.

In some embodiments, the reserve module 138 may be configured to provision a pre-determined amount of reserve capacity 394 within the storage medium 140. The pre-determined amount of reserve capacity 394 may be based on a write capacity profile 346 (FIG. 3C), which may correspond to a pre-determined deployment profile 347A corresponding to a priori characteristics of the storage layer 130, storage controller 139, storage medium 140. I/O clients 106, computing system 100, and the like. The deployment profile 347A may include characteristics, such as the latency of storage recovery operations (e.g., the time required to erase a storage division 370[1]-370[N]), the latency of write operations (e.g., the time required to program data to the storage medium 140), an input/output operations per second (IOPS) capability of the storage layer 130, characteristics of the computing system 100 and/or network 115 (e.g., bandwidth, throughput, and so on), and the like.

The reserve module 138 may be configured to implement a static, pre-determined available storage capacity 392 based on the a priori information of the deployment profile 347A. A static, predetermined reserve percentage may not, however, accurately reflect actual usage conditions of the storage layer 130 and, as such, may result in inefficient operation. As indicated above, a pre-determined reserve percentage may be based on capabilities of the storage layer 130 and/or storage medium 140, such as, for example, a maximum write ION rating of the storage layer 130 and/or storage medium 140. Actual usage and/or operational conditions may significantly differ from these boundary conditions. In one embodiment, for example, the I/O clients 106 may impose light write loads on the storage layer 130, and as such, the pre-determined reserve capacity 394 may be significantly larger than what is actually needed for efficient operation, resulting in wasted storage capacity. In another embodiment, a pre-determined reservation percentage may be based on expected IOPS usage. The I/O clients 106 may, however, impose write loads that are higher than expected, resulting in reduced performance due to write stall conditions.

In some embodiments, the reserve module 138 is configured to dynamically modify the reserve capacity 394. The reserve module 138 may determine the reserve capacity 394 for the storage layer by use of the write capacity metadata 137. As illustrated in FIG. 3C, the write capacity metadata 137 may comprise a write capacity profile 346 that includes a deployment profile 347A pertaining to pre-determined, a priori characteristics of the storage layer 130, as disclosed above, and an operating profile 347B configured to indicate current and/or historical usage characteristics of the storage layer 130. The operating profile 347B may correspond to the availability of write capacity on the storage medium 140 (e.g., may indicate whether the storage layer 130 has sufficient write capacity for efficient operation).

The reserve module 138 may comprise an reserve analysis module 338 configured to determine an optimal reservation capacity 394 for the storage layer 130 by use of the write capacity profile 346. The reserve module 138 may further comprise a monitoring module 339 configured to maintain the operating profile 347B of the storage layer 130 (e.g., develop the operating profile 347B).

The monitoring module 339 may be configured to develop the operating profile 347B by monitoring usage characteristics of the I/O clients 106, the operational conditions of the storage layer 130, and so on. The operating profile 347B may comprise any suitable operating characteristic and/or property including, but not limited to: the write load on the storage layer 130, observed write performance (e.g., observed IOPS capabilities of the storage layer 130 and/or storage medium 140), observed performance of the groomer module 336 (e.g., recovery rate, erase latency, and so on), rate of write requests received from 110 clients 106, size of write requests received at the storage layer 130, write stall rate (if any), groomer priority, availability of write capacity (e.g., number of storage divisions 370[1]-370[N] available in the write queue 337), write operations performed on the storage device per unit time, a rate of write operations performed on the storage device in response to cache misses, a rate of write operations performed on the storage device in response to write operations pertaining to data in the cache, and so on.

The reserve analysis module 338 may be configured to determine the size of the reserve capacity 394 in response to operating conditions of the storage layer 130 (e.g., the write capacity profile 346). As disclosed above, the IOPS of write operations performed on the storage layer 130 may determine the rate at which the write capacity of the storage layer 130 is consumed, and as such, may determine the relative rate of grooming operations and/or the write overhead needed to prevent write stall conditions. Accordingly, in some embodiments, the reserve analysis module 338 may size the reserve capacity 394 in accordance with an observed IOPS rate (e.g., expand the reserve capacity 394 in response to increases in the write load on the storage layer 130, and contract the reserve capacity 394 in response to decreases in the write load). The disclosure is not limited in this regard, however, and may calculate an optimal reserve capacity 394 in response to any suitable characteristic of the operating profile 347B including, but not limited to: write load, write IOPS, ratio of write operations to read operations, groomer performance, write stall conditions (if any), groomer activity, write capacity availability, I/O client 106 demands and/or requests, configuration parameters, and so on. The reserve analysis module 338 may determine that more reserve capacity 394 is needed in response to one or more of: high write TOPS conditions, increased groomer activity (e.g., groomer forced to preempt other I/O requests), low write capacity availability (e.g., fewer than a threshold number of storage divisions 370[1]-370[N] in the write queue), and/or the like. Conversely, the reserve analysis module 338 may determine that less reserve capacity 394 is needed in response to one or more of: low write IOPS conditions (higher proportion of reads than writes), low groomer activity, high write capacity availability, and/or the like.

In embodiments, the reserve analysis module 338 is configured to determine the optimal size for the reserve capacity 394 by use of a reserve policy 348. The reserve policy 348 may comprise trigger conditions and/or rules configured to determine a size of the reserve capacity 394 in response to certain operating conditions (as indicated by the write capacity metadata 346). The reserve policy 348 may comprise configuration parameters 349A, which may be set by, inter alia, the I/O clients 106 (and/or other entities) through the storage interface 131 (and/or other interface mechanism). The configuration parameters 349A may comprise preferences pertaining to the reserve capacity 348, such as a minimum reserve capacity 394, maximum reserve capacity 394, Quality of Service (QoS) parameters, and/or the like. The QoS parameters may comprise write IOPS requirements of one or more I/O clients 106. The reserve analysis module 338 may be configured to set the reserve capacity 394 to ensure that the write IOPS of the QoS parameters can be satisfied, which, in some embodiments, may comprise increasing the size of the reserve capacity 394 to prevent write stall conditions. Alternatively, or in addition, the configuration parameters 349A may comprise a storage capacity availability QoS, configured to guarantee availability of a particular storage capacity to one or more I/O clients 106, which may set an upper limit on the size of the reserve capacity 394.

In some embodiments, the reserve policy 348 may comprise an optimization criterion 349B. The reserve analysis module 338 may use the optimization criterion 349B to determine an optimal reserve capacity 394 for the storage layer 130 by, inter alia, maximizing the optimization criterion 349B. The optimization criterion 349B may correspond to characteristic(s) of the write capacity profile 346 and/or may configuration settings of the I/O clients. The optimization criterion 349B may, for example, be configured to minimize write latency (e.g., reduce write stall conditions), and as such, may weight maximizing write capacity higher than maximizing storage space availability. In another embodiment, the storage layer 130 may be used to cache data of another storage system. Decreasing the reserve capacity 394 may enable the storage layer 130 to improve overall I/O performance by increasing the effective size of the cache. Therefore, in this embodiment, the optimization criterion 349B may be adapted to weight storage capacity availability over write performance.

The reserve module 138 may be configured to dynamically resize the reserved capacity 394 and/or available capacity 392 based on the reservation size determined by the reserve analysis module 338. Dynamically resizing the available capacity 392 may comprise configuring the storage layer 130 to expose different amount(s) of physical storage capacity to the I/O clients 106. Dynamically resizing the available capacity may, therefore, comprise indicating a different storage capacity for the storage device 141 through, inter alia, a storage interface, such as the storage layer interface 131. Reducing the available storage capacity may comprise reformatting and/or resizing a virtual storage device exposed to the I/O clients 106, which may comprise removing data of the I/O clients from the storage medium 140, relocating the data to other storage resources, and/or the like. In some embodiments, resizing the available capacity 392 may comprise issuing a request to resize the storage resources of the storage layer 130 to an entity (e.g. a user, administrator, operating system, hypervisor, and/or the like), and resizing the storage resources based on a response from the entity.

Figure 4A:
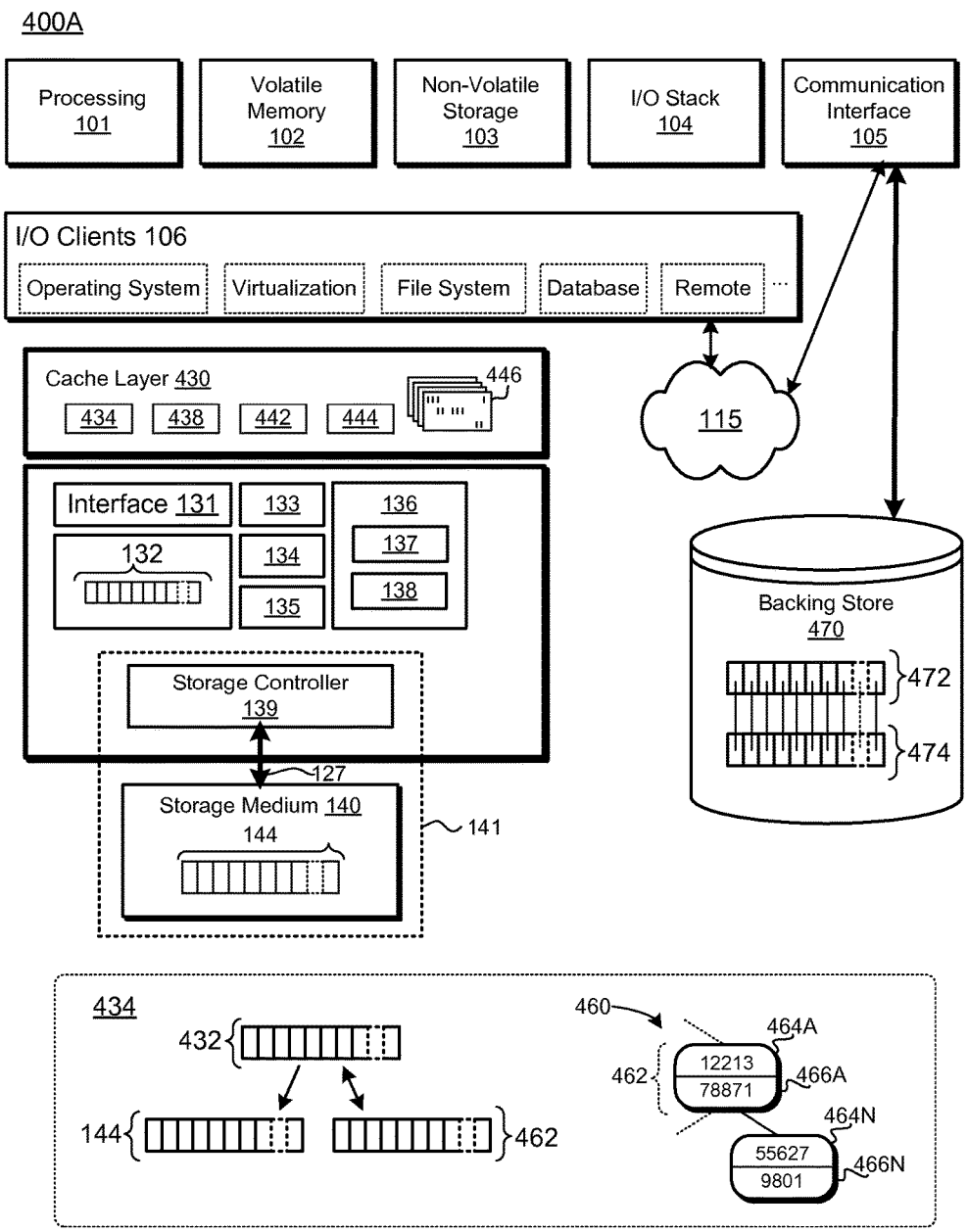
FIG. 4A is a block diagram of one embodiment of a storage system configured to dynamically manage write capacity.

In some embodiments, modifying the available capacity 392 may comprise reconfiguring an I/O client 106 utilizing storage services of the storage layer 130, such as a cache. FIG. 4A depicts one embodiment of a system 400A comprising a cache layer 430 configured to cache data of a backing store 470. The cache layer 430 may be paired with the storage layer 130 to cache data of the backing store 470. In some embodiments, the cache layer 430 may be implemented as a component and/or module of the storage layer 130. Alternatively, and as illustrated in FIG. 4A, the cache layer 430 may be implemented separately from the storage layer 130 (e.g., as an I/O client 106).

The backing store 470 may comprise storage resources including, but not limited to: one or more a hard drives, a RAID, a JBOD storage system, a network attached storage (NAS) system, a storage area network (SAN), and/or the like. The backing store 470 may comprise a plurality of physical storage locations capable of storing data of the I/O clients 106 (storage address space 474). The backing store 470 may be communicatively coupled to the computing system 100 and/or cache layer 430 through a local bus, remote bus, network 115, and/or the like.

I/O clients 106 may access the storage resources of the backing store 470 through a backing store address space (BSAS) 472. The BSAS 472 may correspond to a logical address space of the backing store 470 and may comprise a set, range and/or extent of identifiers (LBAs), as disclosed herein. The identifiers of the BSAS 472 may correspond to physical storage locations within a storage address space 474 of the backing store 470. As illustrated FIG. 4A, the mappings may comprise deterministic one-to-one mappings between the BSAS 472 and the storage address space 474 (e.g., cylinder-sector-head to LBA mappings). In other embodiments, the backing store 470 may comprise a mapping layer configured to implement other mapping schemes, such as any-to-any mappings between the BSAS 472 and storage address space 474.

The cache layer 430 be configured to selectively cache data of the backing store 470 on the storage medium 140. The cache layer 430 may maintain cache metadata 434 corresponding to the cache storage resources available to the cache layer 430. The cache storage resources may be represented by use of cache entries or cache tags 432 (e.g., a cache address space), which may be configured to identify data of the backing store 470 that has been cached on the storage medium 140 (and/or identify storage capacity available to the cache layer 430). The cache tags 432 may be assigned to respective LBAs of the BSAS 472 and/or to storage locations on the storage medium 140. Mappings between the LBAs and the storage locations may be maintained in any suitable mapping structure including, but not limited to: an index, a map, a hash map, a hash table, a tree, a range-encoded tree, a b-tree, and/or the like. As illustrated in FIG. 4A, in some embodiments, the cache tags 432 may correspond to a forward map 460 comprising entries 462 configured to map identifiers 464A-N of the BSAS 472 (e.g., LBAs 12213 and 55627) to respective storage addresses 466A-N within the storage address space 144 of the storage medium 140 (e.g., any-to-any, fully associate cache mappings). The map identifiers 464A-N may map to storage addresses within the storage address space 474 of the backing store by use of a translation layer of the backing store 470 and/or other storage layer. In other embodiments, the cache metadata 434 may comprise set-associative and/or n-way associative mappings.

In some embodiments, the cache layer 430 is configured to implement the cache metadata 434 by use of the storage metadata 134 maintained by the storage layer 130 (e.g., the cache tags 432 may be implemented by use of the forward map 160, as disclosed herein). Alternatively, the cache layer 430 may maintain the cache metadata 434 separately and/or independently of the storage metadata 134.

The cache layer 430 may comprise an I/O redirection module 442 configured to filter I/O requests within the I/O stack 104 of the computing system 100. The I/O stack 104 may define a storage architecture in which storage services, such as file system drivers, volume drivers, disk drivers, and the like, are deployed. Storage services may be configured to intemperate by issuing and/or consuming I/O requests within various layers of the I/O stack 104, which may include a file layer, a volume layer, a disk layer, a SCSI layer, and so on. The I/O redirection module 442 may comprise a filter driver configured to monitor I/O requests within the I/O stack 104, such as I/O request packets (IRP) of a Microsoft Windows® operating system. The disclosure is not limited in this regard, however, and may be applied to any suitable I/O stack 104 and/or framework of any operating system (e.g., Unix®, LINUX, OSX®, Solaris®, or the like). The I/O redirection module may identify I/O requests directed to the backing store 470, and selectively redirect the I/O requests to the cache layer 430 to be serviced within the cache layer 430.

The cache layer 430 may further comprise an admission module 444 configured to selectively admit data of the backing store 470 into the cache on the storage medium 140 based on, inter alia, access metadata 446 pertaining to the BSAS 472 and/or cache tags 432. Further embodiments of cache storage systems are disclosed in U.S. patent application Ser. No. 13/349,417 entitled "Systems and Methods for Managing Cache Admission," filed Jan. 12, 2012 for Nisha Talagala et al., which is hereby incorporated by reference in its entirety.

The cache tags 432 may correspond to the storage capacity available to the cache layer 430 (e.g., the amount of data the cache layer 430 is capable of caching). The cache layer 430 may be paired with the storage layer 130, which may be configured to provision storage capacity to the cache layer 430. The storage capacity provisioned to the cache layer 430 may be based on a) the available physical storage capacity 392 of the storage layer 130 and/or b) storage requirements of other I/O clients 106, and/or the like.

The cache layer 430 may comprise an allocation module 438 configured to adjust the size of the cache in accordance with the storage capacity provisioned to the cache layer 430. The allocation module 438 may be configured to increase and/or decrease the size of the cache in response to changes in the storage capacity allocated to the cache layer 430. The allocation module 438 may be configured to increase the size of the cache by, inter alia, provisioning one or more additional cache lines and/or cache storage locations for use in caching data of the backing store 470. Accordingly, increasing the size of the cache may comprise provisioning one or more additional cache tags 432. Decreasing the size of the cache may comprise removing one or more existing cache lines and/or cache storage locations from the cache, which may comprise removing one or more of the cache tags 432. Removing a cache tag 432 may comprise evicting the cache tag 432 from the cache by, inter alia, a) removing the cache tag 432 from the storage metadata 434, and/or b) flushing the cache tag 432 to the backing store 470 (e.g., writing dirty and/or unsynchronized data of the evicted cache tag 432 to the backing store 470).

The allocation module 438 may be configured to adjust the size of the cache in response to dynamic changes to the reserve capacity 394 implemented by the reserve module 138. As disclosed herein, the reserve module 138 may be configured to dynamically adjust the reserve capacity 392 in response to, inter alia, operating conditions on the storage layer 130. The reserve module 138 may, for example, be configured to increase the reserve capacity 394 (reducing the available capacity 392) in response to high write load conditions, and to decrease the reserve capacity 394 (increasing the available capacity 392) in response to low write load conditions. The reserve module 138 may be configured to inform the allocation module 438 of changes to the reservation capacity 494, and the allocation module 482 may adjust the size of the cache accordingly (e.g., by adding and/or removing cache tags 432, as disclosed herein). In some embodiments, the reserve module 138 is configured to request a change to the storage allocation to the I/O clients 106 (e.g., cache layer 430), and implement the requested change in response to acknowledgement(s) from the I/O clients 106. In response to a request to change the storage capacity available to the cache layer 430, the allocation module 438 may be configured to adjust the size of the cache (e.g., by evicting data from the cache), and acknowledge the request in response to completing the cache size adjustment(s). The request-acknowledge interface may be configured to prevent data loss due to storage capacity changes.

FIG. 49 illustrates embodiments 4009 of cache size adjustment implemented by the cache layer 430 and/or storage layer 130, as disclosed herein. In state 415A, the cache layer 430 may comprise a cache capacity 496A, which may correspond to M cache tags 432[1]-432[M]. The cache layer 430 may be configured to cache data of the backing store 470 on the storage medium 140 by use of, inter alia, the cache tags 432[1]-432[M]. Accordingly, each of the cache tags 432[1]-432[M] may correspond to data of the backing store 470 admitted into the cache by the cache admission module 444 (e.g., and stored on the storage medium 140). As disclosed above, the cache layer 430 may be configured to maintain access metadata 446, which may comprise, inter cilia, access characteristics pertaining to BSAS 472 and/or cache tags 432[1]-432[M].

In state 415B, the allocation module 438 may receive an indication that the storage capacity provisioned to the cache layer 430 is to be reduced. In response, the allocation module 438 may select one or more cache tags 432[1]-432[M] for eviction. The allocation module 438 may determine the number of cache tags 432[1]-432[M] to remove in order to comply with the requested capacity reduction. The cache tag reduction 497 may be determined based on the modification to the storage capacity provisioned to the cache layer 430 and/or the size of the cache tags 432[1]-432[M] (e.g., the storage capacity represented by the respective cache tags 432[1]-432[M]). In state 415B of the FIG. 4B embodiment, the allocation module 438 may determine that the cache tag reduction 497 corresponds to removal of E cache tags 432[1]-432[1M].

Figure 4B:
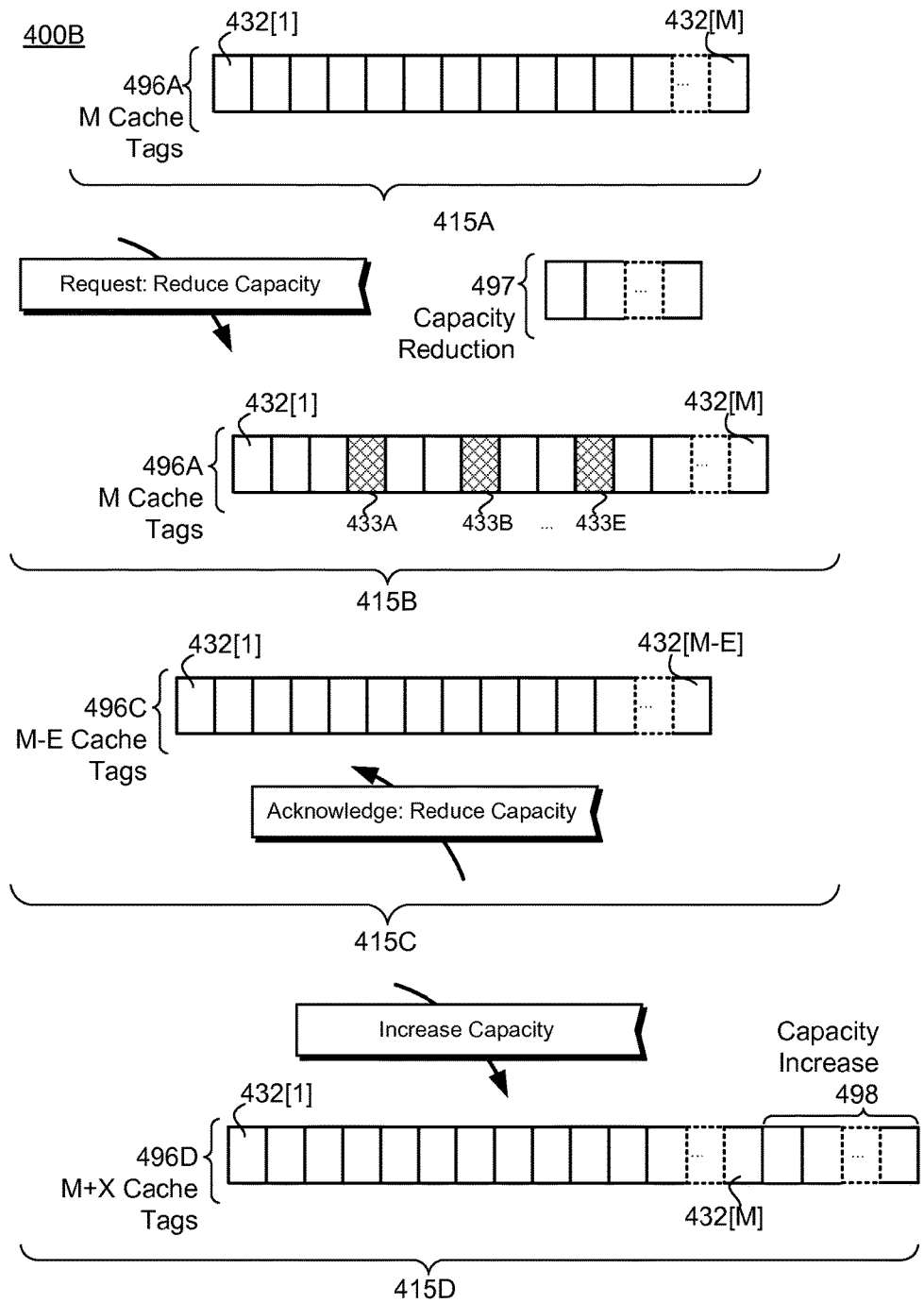
FIG. 4B is a block diagram of embodiments of dynamic write capacity management operations.

The allocation module 438 may be configured to select a set of E cache tags 433A-E for eviction from the cache. In some embodiments, the set of E cache tags 433A-E may be selected from a particular region and/or section of the cache tags 432[1]-432[M] (e.g., the last E cache tags 432[M−E] 432[M]). Alternatively, and as depicted in FIG. 4B, the cache tags 433A-E may be selected anywhere within the set of cache tags 432[1]-432[M]. The set of E cache tags 433A-E may be selected by use of the admission module 444, which may select the cache tags 433A-E based on access characteristics of the cache tags 433A-E least recently accessed, sequentially, and/or the like).

In response to selecting the cache tags 433A-E, the cache layer 430 may be evicted by: a) writing data of the cache tags 433A-E to the backing store 470 (if necessary), and b) deallocating the cache tags 433A-E. Deallocating the cache tags 433A-E may comprise removing the cache tags 433A-E from the cache metadata 434, removing entries corresponding to the cache tags 433A-E from a forward map 160 (and/or other mapping structures), and the Deallocating the cache tags 433A-E may further comprise issuing one or more deallocation messages (TRIM messages) to the storage layer 130 indicating that data corresponding to the cache tags 433A-E does not need to be retained on the storage medium 140.

Removing the cache tags 433 may further comprise modifying the cache metadata 434 to reference a reduced number of cache tags 432. As illustrated in state 415O, evicting the cache tags 433A-E may result in the cache metadata 434 comprising a smaller set of cache tags 432[1]-432[M-E], corresponding to the reduced storage capacity 496O provisioned to the cache layer 430. In response to removing the cache tags 433A-E (and/or modifying the cache metadata 434) the allocation module 438 may acknowledge completion of the capacity reduction. In response to the acknowledgement, the reserve module 138 may implement the reduction in available capacity 392 (an increase to reserve capacity 394), as disclosed herein.

The allocation module 438 may be configured increase the size of the cache in response to, inter alia, an indication from the storage layer 130 that additional storage capacity is available to the cache layer 430 (e.g., based on a reduction in the reserve capacity 394, as disclosed above). The allocation module 438 may be configured to add one or more cache tags 432 based on the increase in storage capacity (e.g. the amount of additional storage capacity provisioned to the cache layer 430 and/or the storage capacity corresponding to each cache tag 432). The storage capacity increase illustrated in state 415D corresponds to X additional cache tags 432 (capacity increase 498), resulting in an increased cache capacity 496D corresponding to M+X cache tags 432. The allocation module 438 may add the X cache tags 432 using any suitable mechanism. In some embodiments, the allocation module 438 may insert the cache tags 432 into the forward map 160 (and/or other data structure and/or pool), and, in response, the admission module 444 may utilize the cache tags 432 to admit data of the backing store 470 into the cache, as disclosed herein.

Referring back to FIG. 3C, the reserve module 138 may comprise an reserve analysis module 338 configured to determine an optimal size of the reserve capacity 394 based on, inter alia a reserve policy 348 and/or write capacity profile 346. The write capacity profile 346 comprises an operating profile 347B that includes and/or indicates operating characteristics of the storage layer 130. The write capacity profile 346 may be maintained by a monitoring module 339, configured to monitor operating conditions on the storage layer 130. In some embodiments, the cache layer 430 may be configured to provide cache profiling information to the monitoring module 339 (through the storage interface 131). The cache profile information may correspond to the access metrics of the cache entries (access metrics of LBAs within the BSAS 472), cache write load (e.g., write IOPS), cache read load (e.g., read IOPS), cache hit rate, cache eviction rate, and the like. The cache profile information may pertain to LBAs admitted into the cache. In some embodiments, the cache profile information may further comprise profiling information and/or access metrics pertaining to LBAs of the backing store 470 that have not been admitted into the cache. The cache profile information may further include cache performance metrics, such as cache hit rate and/or cache miss rates, and/or the like.

The monitoring module 339 may be configured to incorporate the cache profiling information received from the cache layer 430 into the write capacity profile 346, for use by the reserve analysis module 338 to determine an optimal size of the reserve capacity 394. The cache profiling information may, for example, indicate expected performance impacts of changes to the reserve capacity 394. In one embodiment, the cache profiling information may indicate a high cache miss rate. In response, the reserve analysis module 338 may reduce the size of the reserve capacity 494, which may increase the size of the available capacity 492, allowing the cache layer 430 to admit additional data into the cache and, inter cilia, reduce the cache miss rate. In another embodiment, the cache profiling information may indicate a low miss rate. In response and/or in combination with other factors (such as low write capacity and/or the like), the reserve analysis module 338 may increase the reserve capacity 394 since, based on the cache profiling information, the reduction in cache capacity is unlikely to significantly affect performance.

In some embodiments, the allocation module 438 of the cache layer 430 may be configured to request a particular storage capacity. The allocation module 438 may request the storage capacity through the storage interface 131 (and/or other interface mechanism). The requested storage capacity may be indicated in the reserve policy 348 as configuration parameter 349A (e.g., a QoS policy for the cache layer 430) and/or an optimization criterion 349B, as disclosed herein.

Figure 5:
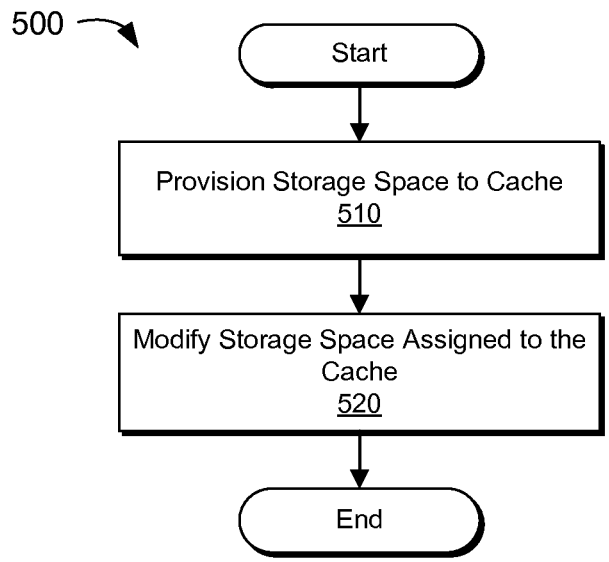
FIG. 5 is a flow diagram of one embodiment of a method for adaptive storage reservations.

FIG. 5 is a flow diagram of one embodiment of a method 500 for reserving storage capacity. Step 510 may comprise assigning storage space of a storage layer 130 to a cache, such as the cache layer 430 disclosed herein. Step 510 may comprise selecting a reserve capacity for the storage layer 130 based on, inter alia, a write capacity profile 349 (e.g., deployment profile 347A and/or operating profile 347B), as disclosed herein. Provisioning storage capacity at step 510 may comprise reporting a storage capacity of the storage layer 130 through a storage interface 131 and/or within an I/O stack 104 of the computing system 100. Alternatively, or in addition, provisioning the storage capacity at step 510 may comprise informing the cache layer 430 of the storage capacity provisioned thereto through, inter alia, the storage interface 131 and/or other interface mechanism.

Step 520 may comprise modifying the storage space assigned to the cache layer 430. Step 520 may be performed in response to the reserve analysis module 338 determining a different size for the reserve capacity 394 based on, inter alia, the write capacity profile 346 and reserve policy 348, as disclosed herein.

In some embodiments, the reserve analysis module 338 may determine a size for the reserve capacity 394 based on, inter alia, the write load on the storage layer 130. The write load on the storage layer 130 may be a function of one or more of the write capacity available to the storage layer 130 (e.g., the number of storage divisions 370[1]-370[N] available in the write queue 337), the IOPS rate of write requests performed on the storage layer 130, a size and/or throughput of the write requests, a ratio of write to read requests, groomer performance, groomer priority, and so on. Step 520 may, therefore, comprise maintaining a write capacity profile 346 by use of, inter alia, the monitoring module 339, as disclosed herein. Step 520 may further comprise receiving cache profiling information from the cache layer 430.

In some embodiments, step 520 comprises increasing the storage capacity provisioned to the cache layer 130 in response to low write load conditions, and decreasing the storage capacity provisioned to the cache layer 130 in response to high write load conditions. Step 520 may further comprise informing the cache layer 430 of the change in storage capacity provisioned thereto. In response, the allocation module 438 of the cache layer 430 may be configured to add and/or remove cache tags 432, as disclosed herein.

Figure 6:
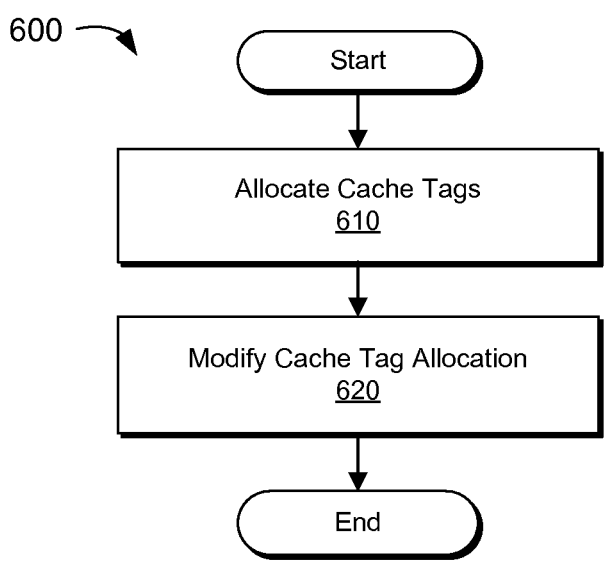
FIG. 6 is a flow diagram of another embodiment of a method for adaptive storage reservations.

FIG. 6 is a flow diagram of another embodiment 600 for managing write capacity of a storage medium 140. Step 610 may comprise allocating storage capacity to a cache layer 430. Step 610 may comprise allocating cache tags 432 for use by the cache layer 430 in accordance with the storage capacity provisioned to the cache layer 430.

Step 620 may comprise modifying the cache tag allocation of step 610. Step 620 may be performed in response to a request to modify the storage resources provisioned to the cache layer 430. The request may be received from the reserve module 138 of the storage layer 130, as disclosed herein. Modifying the cache tag allocation at step 620 may comprise reducing the size of the cache by: a) selecting cache tags 432 for eviction from the cache, and b) removing the selected cache tags 432. Removing the cache tags 432 may comprise flushing the cache tags 432 to the backing store 470 by, inter alia, writing data of the cache tags 432 to the backing store 470 (if necessary). Removing the selected cache tags 432 may further comprise deallocating the cache tags 432 by, inter alit, removing the cache tags from the cache metadata 434 and/or issuing one or more de-allocation messages to the storage layer 130 indicating that data corresponding to the selected cache tags 432 does not need to be retained on the solid-state storage medium 140.

Figure 7:
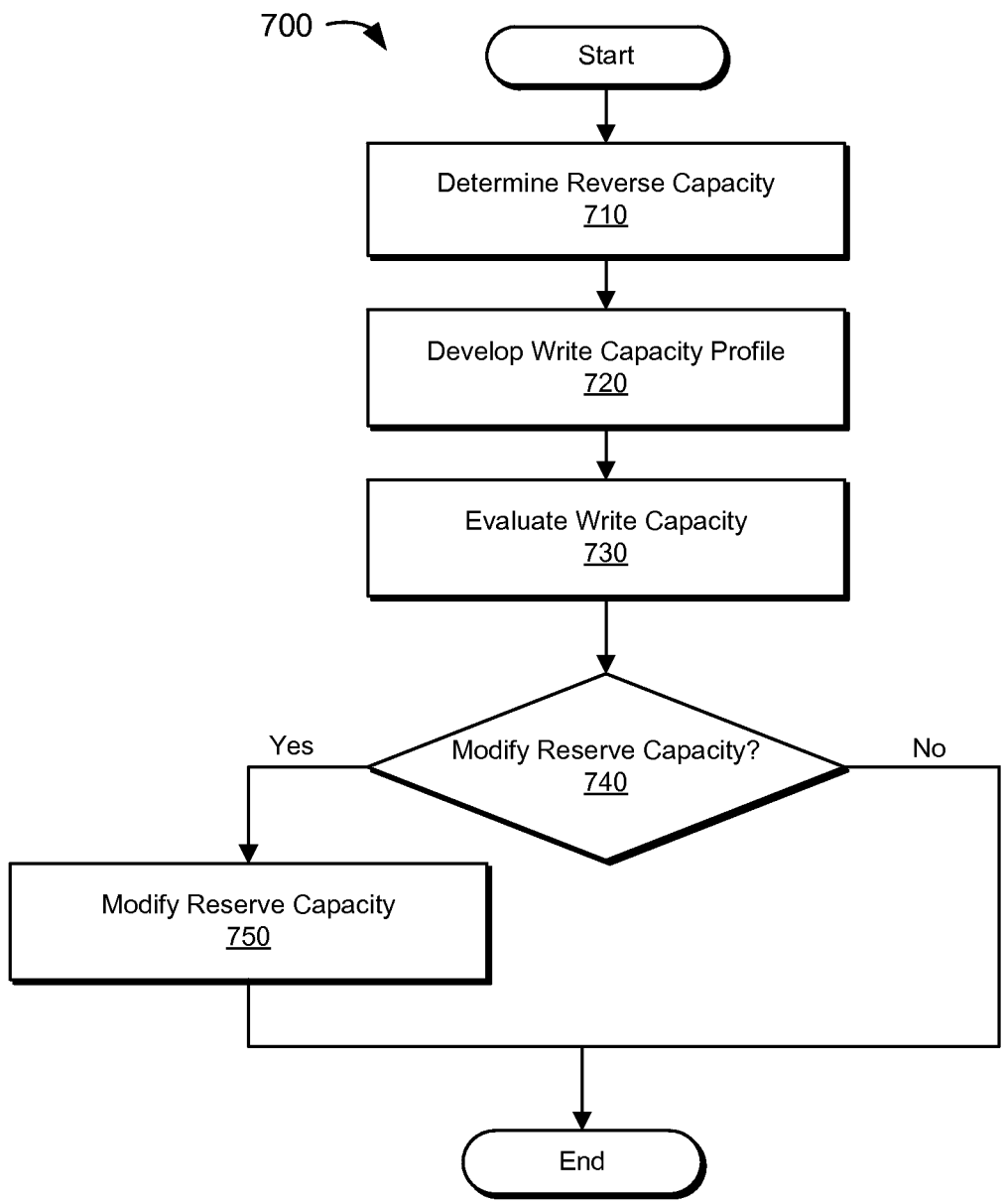
FIG. 7 is a flow diagram of another embodiment of a method for adaptive storage reservations.

FIG. 7 is a flow diagram of another embodiment of a method 700 for adaptive storage reservations. Step 710 may comprise determining a reserve capacity 394 for the storage layer 130. Step 710 may be based on characteristics of the deployment profile 347A of the write capacity profile 346. In some embodiments, step 710 may comprise reserving a pre-determined or default amount of reserve capacity 394. Step 710 may comprise reporting the storage capacity, of the storage device 141 as the available storage capacity 392, which may differ from the frill physical storage capacity 390 of the storage medium 140. Step 710 may further comprise provisioning storage capacity to one or more I/O clients 106, such as the cache layer 430, as disclosed herein.

Step 720 may comprise developing a write capacity profile 346 by use of, inter alia, the monitoring module 339. Step 720 may comprise monitoring operating conditions of the storage layer 130, including, but not limited to: write load, write IOPS, ratio of write operations to read operations, groomer performance, write stall conditions (if any), groomer activity, write capacity availability, I/O client 106 demands and/or requests, and the like. Step 720 may comprise receiving profiling information from other I/O clients 106, such as cache profiling information from the cache layer 430.

Step 730 may comprise evaluating the write capacity profile information 346 and/or reserve policy 348 in order to determine whether the reserve capacity 394 should be modified. Step 730 may comprise determining an optimal reserve capacity 394 for the storage layer 130. The optimal reserve capacity 394 may be determined by applying configuration parameters 349A, such as QoS policies, configuration parameters, and/or the like, to the operating conditions of the storage layer 130 as indicated by the write capacity profile 346. Alternatively, or in addition, step 730 may comprise evaluating an optimization criterion 349B configured to weight performance characteristics according to configuration preferences of the I/O) clients 106, as disclosed herein.

Step 740 may comprise determining whether to modify the reserve capacity 394. Step 740 may comprise comparing the reserve capacity 394 determined at step 740 (e.g., the optimal reserve capacity 742) to the current reserve capacity 394. Step 740 may comprise determining to modify the reserve capacity 740 in response to the optimal reserve capacity 394 differing from the current reserve capacity 394 by more than a threshold. The threshold of step 740 may be configured to prevent excessive modifications to the reserve capacity 394 (e.g., thrashing). In some embodiments, steps 730 and/or 740 may comprise heuristics feedback mechanisms configured to prevent modifications to the reserve capacity 394 due to transient and/or short-term operating conditions.

In response to determining that the reserve capacity 394 is to be modified, the flow may continue to step 750. Step 750 may comprise modifying the reserve capacity 394 (and available capacity 392) in accordance with the optimal reserve capacity determined at step 730. As disclosed above, modifying the reserve capacity 394 may comprise modifying storage capacity allocations to one or more I/O clients 106. Step 750 may comprise informing the I/O clients 106 of the change in available storage capacity 392. In some embodiments, step 750 comprises issuing a request to modify the storage capacity to one or more I/O clients 106 (e.g., the cache layer 430). Step 750 may further comprise implementing the modification in response to receiving an acknowledgement from the one or more I/O clients 106.

Figure 8:
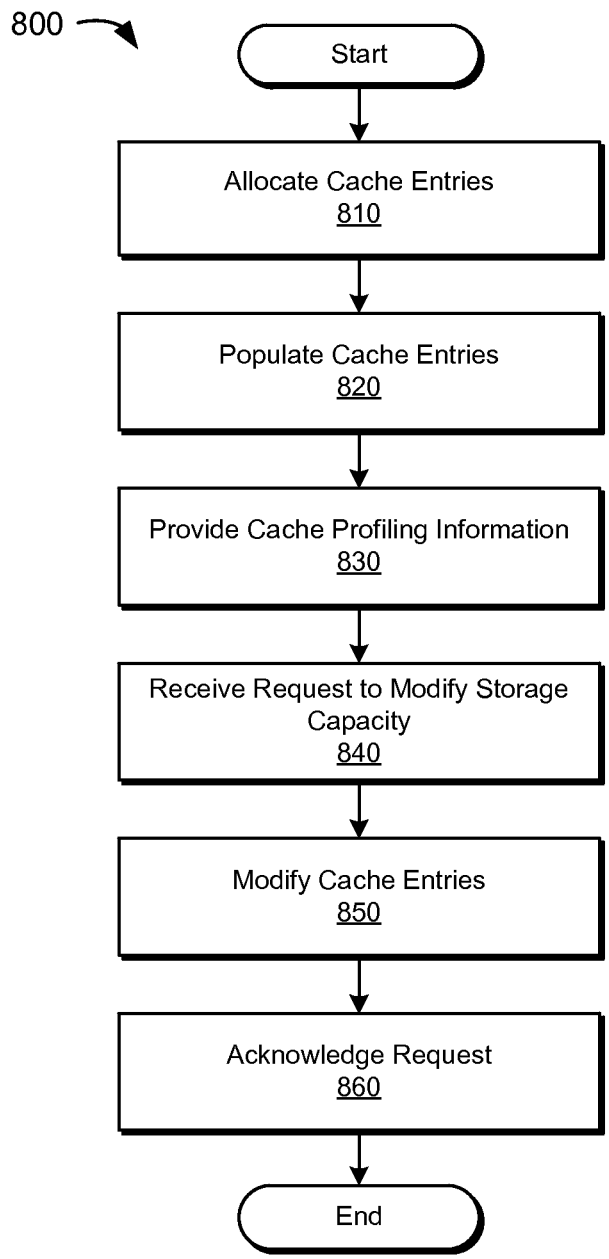
FIG. 8 is a flow diagram of another embodiment of a method for adaptive storage reservations.

FIG. 8 is a flow diagram of another embodiment of a method 800 for adaptive storage reservations. Step 810 may comprise allocating cache entries (e.g., cache tags 432) of a cache layer 430. Step 810 may comprise allocating the cache entries in accordance with the storage resources and/or capacity available to the cache layer 430 in a storage device 141.

Step 820 may comprise populating the cache entries with data of a primary storage system, such as the backing store 470. Populating the cache entries may comprise admitting data of the primary storage into the cache by, inter cilia, storing data of the primary storage on the storage medium 140 using the storage layer 130.

Step 830 may comprise providing cache profiling information to the storage layer 130. The cache profiling information may include, but is not limited to: access metrics of the cache entries (access metrics of LBAs within the BSAS 472), cache write load (e.g., write IOPS), cache read load (e.g., read IOPS), cache hit rate, cache eviction rate, and/or the like. Step 830 may, therefore, comprise maintaining cache profiling information pertaining to the cache, providing access to the cache profiling information to the storage layer 130 and/or transmitting the cache profiling information to the storage layer 130. The monitoring module 339 of the storage layer 130 may be configured to incorporate the cache profiling information into a write capacity profile 346, which may be used to determine an optimal reserve capacity 394, as disclosed herein.

Step 840 may comprise receiving a request to modify the storage capacity allocated to the cache layer 430. Step 840 may be received from the storage layer 130 in response to the reserve analysis module 338 determining a different optimal reserve capacity 394 by use of the write capacity profile 346 and/or reserve policy 348, as disclosed herein.

Step 850 may comprise modifying the cache entries in accordance with the modified storage capacity of step 840. Step 850 may comprise adding or removing cache entries. Adding cache entries may comprise appending and/or inserting additional cache entries into cache metadata 434 for use by the admission module 444 to cache additional data of the primary storage. Removing cache entries may comprise a) selecting cache entries to remove based on, inter alia, cache access metadata 446 maintained by the cache layer 430, b) removing the selected cache entries by, inter alia, flushing the cache entries to the backing store and/or deallocating cache entries in the cache metadata 434 and/or storage layer 130.

Step 860 may comprise acknowledging the request of step 840. The request may be acknowledged in response to modifying the cache entries at step 850 (e.g., flushing the cache entries that are to be removed).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method, comprising:
allocating storage space of a storage device for use as cache storage, the storage device comprising a plurality of storage divisions;
monitoring an erased capacity of the storage device, the monitoring comprising identifying storage divisions of the storage device that are currently in an erased state such that the erased capacity corresponds to a storage capacity of the identified storage divisions, excluding storage divisions of the storage device not identified as currently being in the erased state, wherein:
  servicing a write request using a storage division not identified as currently being in the erased state comprises performing an erase operation to place the storage division into the erased state prior to writing data of the write request to the storage device, and
  servicing the write request using a storage division identified as currently being in the erased state excludes performing the erase operation prior to writing the data of the write request to the storage device; and
modifying a size of the cache storage based on the monitored erased capacity of the storage device, the modifying comprising:
  increasing the size of the storage space of the storage device allocated for use as cache storage in response to the monitoring indicating increased erased capacity of the storage device, and
  decreasing the size of the storage space of the storage device allocated for use as cache storage in response to the monitoring indicating decreased erased capacity of the storage device.

2. The method of claim 1, wherein the monitoring further comprises tracking a number of storage divisions in a write queue, the storage divisions in the write queue identified as being in the erased state.

3. The method of claim 1, wherein:
a portion of the storage space of the storage device is designated as reserve storage space,
increasing the size of the storage space of the storage device allocated for use as cache storage comprises decreasing a size of the reserve storage space, and
decreasing the size of the storage space of the storage device allocated for use as cache storage comprises increasing the size of the reserve storage space.

4. The method of claim 3, further comprising:
using the reserve storage space to relocate data within the storage device.

5. The method of claim 3, further comprising:
using the reserve storage space for one or more of: grooming operations, storage division recovery operations, data relocation operations, and write capacity.

6. The method of claim 1, wherein decreasing the size of the storage space of the storage device allocated for use as cache storage comprises evicting selected data from the cache storage.

7. The method of claim 6, wherein evicting the selected data from the cache storage comprises deallocating the selected data in the storage device.

8. The method of claim 6, wherein decreasing the size of the cache storage comprises removing one or more entries from a cache.

9. An apparatus, comprising:
- a storage layer coupled to a storage medium comprising a plurality of storage locations, the storage layer is configured to:
  - perform recovery operations on selected storage locations of the storage medium, the recovery operations to erase the selected storage locations to an erased state, wherein the recovery operations are performed by use of reserve storage capacity of the storage medium, the reserve storage capacity comprising a first portion of a physical storage capacity of the storage medium, such that a second portion of the physical storage capacity comprises an available storage capacity of the storage medium; and
  - satisfy write requests by use of the available storage capacity of the storage medium,
- wherein:
  - satisfying a write request by use of a storage location not determined to be in the erased state comprises performing a recovery operation on the storage location to place the storage location into the erased state, and
  - satisfying the write request by use of a storage location determined to be in the erased state excludes performing a recovery operation; and
- a media manager configured to:
  - determine whether respective storage locations of the storage medium are in the erased state;
  - monitor availability of erased storage locations on the storage medium, the erased storage locations including storage locations of the storage medium determined to be in the erased state, excluding storage locations of the storage medium not determined to be in the erased state; and
  - adapt a size of the reserve storage capacity of the storage medium based on the monitored availability of erased storage locations on the storage medium, wherein the media manager increases the size of the reserve storage capacity in response to the monitored availability of erased storage locations being below a threshold, wherein increasing the size of the reserve storage capacity comprises decreasing a size of the available storage capacity.

10. The apparatus of claim 9, wherein the media manager is further configured to:
- monitor storage operations performed on the storage medium; and
- determine an operating profile based on the monitored storage operations, the operating profile comprising one or more of a rate of write operations, a ratio of write operations to read operations, monitored availability of erased storage locations, and write stall conditions.

11. The apparatus of claim 10, wherein the media manager is further configured to determine an optimal size of the reserve storage capacity by use of the operating profile.

12. The apparatus of claim 9, wherein the media manager is further configured to reduce the size of the reserve storage capacity in response to the monitored availability of erased storage locations on the storage medium exceeding an availability threshold.

13. The apparatus of claim 12, wherein reducing the size of the reserve storage capacity comprises expanding the size of the available storage capacity of the storage medium.

14. The apparatus of claim 9, further comprising a groomer configured to perform recovery operations on selected storage locations of the storage medium, wherein performing a recovery operation on selected storage locations comprises:
- identifying valid data stored on one or more of the selected storage locations,
- relocating the valid data to one or more storage locations of the storage medium other than the selected storage locations, and
- erasing the selected storage locations.

15. The apparatus of claim 9, further comprising a cache configured to:
- cache data within the available storage capacity of the storage medium in association with respective cache tags; and
- reallocate the cache tags in response to the media manager increasing the size of the reserve storage capacity.

16. The apparatus of claim 9, further comprising a cache configured to:
- cache data within cache storage on the storage medium, wherein a size of the cache storage corresponds to the size of the available storage capacity of the storage medium;
- decrease the size of the cache storage in response to the media manager increasing the size of the reserve storage, the decrease comprising evicting data from cache storage on the non-volatile storage medium; and
- increase the size of the cache storage in response to the media manager decreasing the size of the reserve storage.

17. A non-transitory computer-readable storage medium comprising program instructions configured for execution by a processor to perform operations, comprising:
- performing storage operations on a solid-state storage medium comprising a plurality of blocks, wherein performing the storage operations comprises:
  - performing recovery operations on the solid-state storage medium by use of reserve capacity of the solid-state storage medium, the reserve capacity comprising a first allocation of a storage capacity of the solid-state storage medium, wherein performing a recovery operation on a selected block of the solid-state storage medium comprises erasing the selected block to an erased state;
  - performing write operations to store data on the solid-state storage medium in response to client requests by use of a second allocation of the storage capacity of the solid-state storage medium, the second allocation designated for storing client data on the solid-state storage medium, wherein:
    - completing a client request using a first block of the solid-state storage medium not in the erased state comprises a write stall for performing a recovery operation on the first block prior to performing a write operation to store data of the client request on the solid-state storage medium, and
    - completing the client request using a second block of the solid-state storage medium that is in the erased state omits the write stall prior to the write operation to store the data of the client request on the solid-state storage medium;
- monitoring the storage operations performed on the solid-state storage medium to distinguish blocks of the solid-state storage medium that are currently in the erased state from blocks that are not currently in the erased state, the monitoring comprising:

determining an erased capacity of the solid-state storage medium, the erased capacity comprising a storage capacity of blocks of the solid-state storage medium identified as being currently in the erased state, excluding blocks of the solid-state storage medium not identified as currently being in the erased state; and adjusting a size of the reserve capacity of the solid-state storage medium based on the erased capacity of the solid-state storage medium determined by the monitoring, wherein adjusting the size of the reserve capacity comprises:
reducing a size of the reserve capacity in response to the determined erased capacity of the solid-state storage medium being above a threshold,
wherein reducing the size of the reserve capacity comprises reducing a size of the first allocation and increasing a size of the second allocation designated for storing client data on the solid-state storage medium.

18. The computer-readable storage medium of claim 17, wherein:
monitoring the storage operations further comprises developing a write profile, the write profile indicating one or more of: a size of a write queue, a rate of write operations performed on the solid-state storage medium, a ratio of write operations to read operations performed on the storage medium, and a rate of recovery operations performed on the solid-state storage medium.

19. The computer-readable storage medium of claim 17, wherein adjusting the size of the reserve capacity further comprises:
increasing the size of reserve capacity in response to the determined erased capacity of the solid-state storage medium being below a write capacity threshold,
wherein increasing the size of the reserve capacity comprises increasing the size of the first allocation and decreasing the size of the second allocation designated for storing client data on the solid-state storage medium.

20. The computer-readable storage medium of claim 17, the operations further comprising:
caching data within cache storage corresponding to the second allocation of the storage capacity of the solid-state storage medium; and
modifying a size of the cache storage in response to adjusting the size of the reserve capacity, the modifying comprising:
increasing the size of the cache storage in response to reducing the size of the reserve capacity, and
decreasing the size of the cache storage in response to increasing the size of the reserve capacity.

* * * * *